(12) United States Patent
Faanes et al.

(10) Patent No.: US 7,334,110 B1
(45) Date of Patent: Feb. 19, 2008

(54) DECOUPLED SCALAR/VECTOR COMPUTER ARCHITECTURE SYSTEM AND METHOD

(75) Inventors: Gregory J. Faanes, Eau Claire, WI (US); Steven L. Scott, Eau Claire, WI (US); Eric P. Lundberg, Eau Claire, WI (US); William T. Moore, Jr., Elk Mound, WI (US); Timothy J. Johnson, Eau Claire, WI (US)

(73) Assignee: Cray Inc., Seattle, WA (US)

( * ) Notice: Subject to any disclaimer, the term of this patent is extended or adjusted under 35 U.S.C. 154(b) by 332 days.

(21) Appl. No.: 10/643,586

(22) Filed: Aug. 18, 2003

(51) Int. Cl.
*G06F 9/38* (2006.01)
(52) U.S. Cl. .................................................... 712/3
(58) Field of Classification Search .................. 712/3
See application file for complete search history.

(56) References Cited

U.S. PATENT DOCUMENTS

| | | | |
|---|---|---|---|
| RE28,577 E | 10/1975 | Schmidt | |
| 4,412,303 A | 10/1983 | Barnes et al. | |
| 4,414,624 A | 11/1983 | Summer, Jr. et al. | |
| 4,541,046 A * | 9/1985 | Nagashima et al. | 712/3 |
| 4,771,391 A | 9/1988 | Blasbalg | |
| 4,868,818 A | 9/1989 | Madan et al. | |
| 4,888,679 A | 12/1989 | Fossum et al. | |
| 4,933,933 A | 6/1990 | Dally et al. | |
| 4,989,131 A | 1/1991 | Stone | |
| 5,008,882 A | 4/1991 | Peterson et al. | |
| 5,031,211 A | 7/1991 | Nagai et al. | |
| 5,036,459 A | 7/1991 | Den Haan et al. | |

(Continued)

FOREIGN PATENT DOCUMENTS

| | | | |
|---|---|---|---|
| EP | 0353819 | A2 | 2/1990 |
| EP | 0475282 | A2 | 9/1990 |
| EP | 0473452 | A2 | 3/1992 |
| EP | 0501524 | A2 | 9/1992 |
| EP | 0570729 | A2 | 11/1993 |
| WO | WO-87/01750 | A1 | 3/1987 |
| WO | WO-88/08652 | A1 | 11/1988 |
| WO | WO-95/16236 | A1 | 6/1995 |
| WO | WO-96/10283 | A1 | 4/1996 |
| WO | WO-96/32681 | A1 | 10/1996 |

OTHER PUBLICATIONS

Patterson, David. Hennessy, John. "Computer Architecture: A Quantitative Approach". Morgan Kaufmann Publishers, Inc. Second Edition,, 1996. pp. 179-187, 373-384, and B-1 through B-15.*
Patterson, David. Hennessy, John. "Computer Architecture: A Quantitative Approach", Morgan-Kaufmann Publishers, Second Edition, 1996. pp. 241-243.*

(Continued)

*Primary Examiner*—Richard L. Ellis
*Assistant Examiner*—Robert E. Fennema
(74) *Attorney, Agent, or Firm*—Schwegman, Lundberg & Woessner, P.A.

(57) ABSTRACT

In a computer system having a scalar processing unit and a vector processing unit, wherein the vector processing unit includes a vector dispatch unit, a system and method of decoupling operation of the scalar processing unit from that of the vector processing unit, the method comprising sending a vector instruction from the scalar processing unit to the vector dispatch unit, wherein sending includes marking the vector instruction as complete if the vector instruction is not a vector memory instruction and if the vector instruction does not require scalar operands, reading a scalar operand, wherein reading includes transferring the scalar operand from the scalar processing unit to the vector dispatch unit, predispatching the vector instruction within the vector dispatch unit if the vector instruction is scalar committed, dispatching the predispatched vector instruction if all required operands are ready, and executing the dispatched vector instruction as a function of the scalar operand.

19 Claims, 9 Drawing Sheets

U.S. PATENT DOCUMENTS

| | | |
|---|---|---|
| 5,068,851 A | 11/1991 | Bruckert et al. |
| 5,105,424 A | 4/1992 | Flaig et al. |
| 5,157,692 A | 10/1992 | Horie et al. |
| 5,161,156 A | 11/1992 | Baum et al. |
| 5,170,482 A | 12/1992 | Shu et al. |
| 5,175,733 A | 12/1992 | Nugent |
| 5,197,130 A | 3/1993 | Chen et al. |
| 5,218,601 A | 6/1993 | Chujo et al. |
| 5,218,676 A | 6/1993 | Ben-ayed et al. |
| 5,239,545 A | 8/1993 | Buchholz |
| 5,276,899 A | 1/1994 | Neches |
| 5,280,474 A | 1/1994 | Nickolls et al. |
| 5,313,628 A | 5/1994 | Mendelsohn et al. |
| 5,313,645 A | 5/1994 | Rolfe |
| 5,331,631 A | 7/1994 | Teraslinna |
| 5,333,279 A | 7/1994 | Dunning |
| 5,341,504 A | 8/1994 | Mori et al. |
| 5,347,450 A | 9/1994 | Nugent |
| 5,353,283 A | 10/1994 | Tsuchiya |
| 5,365,228 A | 11/1994 | Childs et al. |
| 5,375,223 A | 12/1994 | Meyers et al. |
| 5,418,916 A | 5/1995 | Hall et al. |
| 5,430,850 A | 7/1995 | Papadopoulos et al. |
| 5,430,884 A * | 7/1995 | Beard et al. .................. 712/3 |
| 5,434,995 A | 7/1995 | Oberlin et al. |
| 5,440,547 A | 8/1995 | Easki et al. |
| 5,446,915 A | 8/1995 | Pierce |
| 5,517,497 A | 5/1996 | LeBoudec et al. |
| 5,530,933 A | 6/1996 | Frink et al. |
| 5,546,549 A | 8/1996 | Barrett et al. |
| 5,548,639 A | 8/1996 | Ogura et al. |
| 5,550,589 A | 8/1996 | Shiojiri et al. |
| 5,555,542 A | 9/1996 | Ogura et al. |
| 5,560,029 A | 9/1996 | Papadopoulos et al. |
| 5,606,696 A | 2/1997 | Ackerman et al. |
| 5,640,524 A | 6/1997 | Beard et al. |
| 5,649,141 A | 7/1997 | Yamazaki |
| 5,721,921 A | 2/1998 | Kessler et al. |
| 5,765,009 A | 6/1998 | Ishizaka |
| 5,787,494 A * | 7/1998 | DeLano et al. ............. 711/206 |
| 5,796,980 A | 8/1998 | Bowles |
| 5,835,951 A | 11/1998 | McMahan |
| 5,860,146 A | 1/1999 | Vishin et al. |
| 5,897,664 A | 4/1999 | Nesheim et al. |
| 5,987,571 A | 11/1999 | Shibata et al. |
| 6,003,123 A | 12/1999 | Carter et al. |
| 6,014,728 A | 1/2000 | Baror |
| 6,088,701 A | 7/2000 | Whaley et al. |
| 6,101,590 A | 8/2000 | Hansen |
| 6,105,113 A | 8/2000 | Schimmel |
| 6,308,250 B1 | 10/2001 | Klausler |
| 6,308,316 B1 | 10/2001 | Hashimoto et al. |
| 6,389,449 B1 | 5/2002 | Nemirovsky et al. |
| 6,490,671 B1 | 12/2002 | Frank et al. |
| 6,496,925 B1 | 12/2002 | Rodgers et al. |
| 6,519,685 B1 | 2/2003 | Chang |
| 6,684,305 B1 | 1/2004 | Deneau |
| 6,782,468 B1 | 8/2004 | Nakazato |
| 6,816,960 B2 | 11/2004 | Koyanagi |
| 6,922,766 B2 | 7/2005 | Scott |
| 6,925,547 B2 | 8/2005 | Scott et al. |
| 6,976,155 B2 | 12/2005 | Drysdale et al. |
| 2002/0116600 A1 | 8/2002 | Smith et al. |
| 2002/0169938 A1 | 11/2002 | Scott et al. |
| 2002/0172199 A1 | 11/2002 | Scott et al. |
| 2003/0005380 A1 | 1/2003 | Nguyen et al. |
| 2004/0044872 A1 | 3/2004 | Scott |
| 2004/0162949 A1 | 8/2004 | Scott et al. |
| 2005/0044128 A1 | 2/2005 | Scott et al. |
| 2005/0044340 A1 | 2/2005 | Sheets et al. |

OTHER PUBLICATIONS

Patterson, David. Hennessy, John. "Computer Architecture: A Quantitative Approach". Morgan Kaufmann Publishers Inc., Second Edition, 1996. pp. 251-256.*

Abts, D., "So Many States, So Little Time: Verifying Memory Coherence in the Cray X1", *Parallel and Distributed Processing Symposium,* (Apr. 22, 2003), 11-20.

Gharachorloo, K., "Two Techniques to Enhance the Performance of Memory Consistency Models", *Proceedings of the International Conference on Parallel Processing,* (1991), 1-10.

Hennessy, J. L., *Computer Architecture A Quantitative Approach, Second Edition, Morgan Kaufman Publishers, Inc.,* (1996), 39-41.

Scott, S. L., "Decoupled Store Address and Data in a Multiprocessor System", U.S. Appl. No. 10/643,742, filed Aug. 18, 2003, 27 Pages.

Scott, S. L., "Latency Tolerant Distributed Shared Memory Multiprocessor Computer", U.S. Appl. No. 10/643,585, filed Aug. 18, 2003, 17 Pages.

Scott, S. L., et al., "Multistream Processing Memory-and Barrier-Synchronization Method and Apparatus", U.S. Appl. No. 10/643,741, filed Aug. 18, 2003, 143 pages.

Scott, S. L., et al., "Relaxed Memory Consistency Model", U.S. Appl. No. 10/643,754, filed Aug. 18, 2003, 144 Pages.

Sheets, K., et al., "Remote-Translation Mechanism for a Multinode System", U.S. Appl. No. 10/643,758, filed Aug. 18, 2003, 42 Pages.

"Msync—Synchronise Memory with Physical Storage", *The Single UNIX® Specification, Version 2: Msync, The Open Group,* http://www.opengroup.org/onlinepubs/007908799/xsh/msync.html,(1997),3 pgs.

Cohoon, J. , et al., *C++ Program Design,* McGraw-Hill Companies, Inc., 2nd Edition,(1999),493.

Patterson, David A., et al., *Computer Architecutre: A Quantitative Approach,* 2nd Edition, Morgan Kaufmann Publishers, Inc., San Francisco, CA,(1996),699-708.

Patterson, D. A., et al., *Computer Architecture: A Quantitative Approach,* 2nd Edition, Morgan Kaufmann Publishes, Inc.,(1996), 194-197.

"Cray Assembly Language (CAL) for Cray X1™ Systems Reference Manual", *Section 2.6, Memory Ordering,* http://docs.cray.com/books/S-2314-51/index.html,(Jun. 2003), 302 pgs.

"Deadlock-Free Routing Schemes on Multistage Interconnetion Networks", *IBM Technical Disclosure Bulletin,* 35, (Dec. 1992), 232-233.

"ECPE 4504: Computer Organization Lecture 12: Computer Airthmetic", The Bradley Department of Electrical Engineering,(Oct. 17, 2000), 12 pgs.

Adve, V. S., et al., "Performance Analysis of Mesh Interconnection Networks with Deterministic Routing", *IEEE Transactions on Parallel and Distributed Systems,* (Mar. 1994), 225-246.

Bolding, Kevin, "Non-Uniformities Introduced by Virtual Channel Deadlock Prevention", *Technical Report 92-07-07, Department of Computer Science and Engineering, FR-35 University of Washington;* Seattle, WA 98195, (Jul. 21, 1992), 6 pgs.

Bolla, R., "A Neural Strategy for Optimal Multiplexing of Circuit and Packet-Switched Traffic", *Proceedings, IEEE Global Telecommunications Conference,* (1992), 1324-1330.

Boura, Y. M., et al., "Efficient Fully Adaptive Wormhole Routing in n-Dimensional Meshes", *Proceedings, International Conference on Distributed Computing Systems,* (Jun. 1994), 589-596.

Bundy, A. , et al., "Turning Eureka Stepsinto Calculations in Automatic Program", *Proceedings of UK IT 90, (IEE Conf. Pub. 316) (DAI Research Paper 448),* (1991), 221-226.

Carlile, Bradley R., "Algorithms and Design: The CRAY APP Shared-Memory System", *COMPCON Spring '93. Digest of Papers.,* (Feb. 22, 1993), 312-320.

Chen, Y., et al., "UTLB: A Mechanism for Address Translation on Network Interfaces", *Proceedings of the Eighth International Conference on Architectural Support for Programming Languages and Operating Systems (ASPLOS),* (1998),193-204.

Chien, A. A., et al., "Planar-Adaptive Routing: Low-Cost Adaptive Networks for Multiprocessors", *Proceedings, 19th International. Symposium on Computer Architecture*, (May, 1992), 268-277.

Dally, W., J., et al., "Deadlock-Free Adaptive Routing in Multicomputer Networks Using Virtual Channels", *IEEE Transactions on Parallel and Distributed Systems*, 4(4), (Apr. 1993), 466-475.

Dally, William, et al., "Deadlock-Free Message Routing in Multiprocessor Interconnection Networks", *IEEE Transactions on Computers*, vol. C-36, (May 1987), 547-553.

Dally, William, "Performance Analysis of *k*-ary *n*-cube Interconnection Networks", *IEEE Transactions on Computers*, 39(6), (Jun. 1990), 775-785.

Dally, W. J., "Virtual Channel Flow Control", *Proceedings, 17th International Symposium on Computer Architecture*, (May, 1990), 60-80.

Duato, J., "A New Theory of Deadlock-Free Adaptive Routing in Wormhole Networks", *IEEE. Transactions on Parallel and Distributed Systems*, 4(12), (Dec. 1993), 1320-1331.

Ernst, D., et al., "Cyclone: A Broadcast-Free Dynamic Instruction Scheduler with Selective Replay", *30th Annual International Symposium on Computer Architecture (ISCA-2003)*, (Jun. 2003), 10 pgs.

Gallager, Robert, "Scale Factors for Distributed Routing Algorithm", *NTC '77 Conference Record*, vol. 2, (1977), 28:2-1-28:2-5.

Glass, C. J., et al., "The Turn Model for Adaptive Routing", *Proceedings, 19th International Symposium on Computer Architecture*, (May 1992), 278-287.

Gravano, L., et al., "Adaptive Deadlock- and Livelock-Free Routing With all Minimal Paths in Torus Networks", *IEEE Transactions on Parallel and Distributed Systems*, 5(12), (Dec. 1994), 1233-1251.

Gupta, Rajiv, et al., "High Speed Synchronization of Processors Using Fuzzy Barriers", *International Journal of Parallel Programming 19(1)*, (Feb. 1990), 53-73.

Ishihata, Hiroaki, et al., "Architecture of Highly Parallel AP1000 Computer", *Systems and Computers in Japan*, 24(7), (1993), 69-76.

Jesshope, C. R., et al., "High Performance Communications in Processor Networks", *Proceedings, 16th International Symposium on Computer Architecture*, (May 1989), 150-157.

Kirkpatrick, S., et al., "Optimization by Simulated Annealing", *Science*, 220(4598), (May 13, 1983), 671-680.

Kontothanassis, L., et al., "VM-Based Shared Memory on Low-Latency, Remote-Memory-Access Networks", *Proceedings of the ACM ISCA '97*, (1997),157-169.

Linder, Daniel H., et al., "An Adaptive and Fault Tolerant Wormhole Routing Strategy for *k*-ary *n*-cubes", *IEEE Transactions on Computers*,40(1), (1991), 2-12.

Lui, Z , et al., "Grouping Virtual Channels for Deadlock-Free Adaptive Wormhole Routing", *Fifth International Conference, Parallel Architectures and Languages Europe*, (PARLE '93), (Jun. 14-17, 1993), 254-265.

Nuth, Peter, et al., "The J-Machine Network", *Proceedings of the IEEE International Conference on Computer Design on VLSI in Computer & Processors*, (1992), 420-423.

O'Keefe, Matthew T., et al., "Static Barrier MIMD: Architecture and Performance Analysis", *Journal of Parallel and Distributed Computing*, 25(2), (Mar. 25, 1995), 126-132.

Scott, S., "Synchronization and Communication in the T3E Multiprocessor", *ASPLOS*, vol. II, (1996), 26-36.

Shumway, M., "Deadlock-Free Packet Networks", *Transputer Research and Applications 2, NATUG-2 Proceedings of the Second Conference of the North American Transputer Users Group*, (Oct. 18-19, 1989), 140-177.

Snyder, L., "Introduction to the Configurable, Highly Parallel Computer", *IEEE Computer 15(1)*, (Jan. 1982), 47-56.

Talia, D., "Message-Routing Systems for Transputer-Based Multicomputers", *IEEE Micro*, 13(3), (Jun. 1993), 62-72.

Wang, Weilin, et al., "Trunk Congestion Control in Heterogeneous Circuit Switched Networks", *IEEE Transactions on Communications*, 40(7), (Jul. 1992), 1156-1161.

Wood, D. A., et al., "An In-Cache Address Translation Mechanism", *Proceedings of the 13th Annual International Symposium on Computer Architecture*, (1986), 358-365.

Wu, Min-You, et al., "DO and FORALL: Temporal and Spacial Control Structures", *Proceedings, Third Workshop on Compilers for Parallel Computers, ACPC/TR*, (Jul. 1992),258-269.

Yang, C. S., et al., "Performance Evaluation of Multicast Wormhole Routing in 2D-Torus Multicomputers", *Proceedings, Fourth International Conference on Computing and Information (ICCI '92)*, (1992),173-178.

Yantchev, J., et al., "Adaptive, Low Latency, Deadlock-Free Packet Routing for Networks of Processors", *IEEE Proceedings, 136, Part E, No. 3*, (May 1989), 178-186.

"U.S. Appl. No. 10/235,898 Non Final Office Action mailed Jul. 7, 2004", 12 pgs.

"U.S. Appl. No. 10/235,898 Notice of Allowance mailed Mar. 15, 2005", 4 pgs.

"U.S. Appl. No. 10/235,898 Response filed Jan. 6, 2005 to Non Final Office Action mailed Jul. 7, 2004", 16 pgs.

"U.S. Appl. No. 10/643,574, Non-Final Office Action Mailed Aug. 7, 2007", 31 pgs.

"U.S. Appl. No. 10/643,574, Advisory Action mailed May 21, 2007", 3 pgs.

"U. S. Appl. No. 10/643,574, Final Office Action mailed Mar. 5, 2007", 31 pgs.

"U.S. Appl. No. 10/643,574, Non-Final Office Action mailed Jan. 30, 2006", 33 pgs.

"U.S. Appl. No. 10/643,574, Non-Final Office Action mailed Jul. 28, 2006", 30 pgs.

"U.S. Appl. No. 10/643,574, RCE and Response Under 37 C.F.R. 1.116 filed Jul. 12, 2007 to Final Office Action mailed Mar. 5, 2007", 19 pgs.

"U.S. Appl. No. 10/643,574, Response filed Nov. 28, 2005 to Non-Final Office Action mailed Jul. 28, 2006", 15 pgs.

"U.S. Appl. No. 10/643,574, Response filed May 1, 2006 to Non-Final Office Action mailed Jan. 30, 2006", 29 pgs.

"U.S. App. No. 10/643,574, Response filed May 4, 2007 to Final Office Action mailed Mar. 5, 2007", 15 pgs.

"U.S. Appl. No. 10/643,585, Advisory Action mailed Apr. 2, 2007", 3 pgs.

"U.S. Appl. No. 10/643,585, Advisory Action mailed Aug. 14, 2006", 3 pgs.

"U.S. Appl. No. 10/643,585, Amendment and Response filed Dec. 4, 2006 to Office Action mailed Oct. 23, 2006", 17 pgs.

"U.S. Appl. No. 10/643,585, Amendment and Response filed Mar. 22, 2007 to Final Office Action Mailed Jan. 25, 2007", 23 pgs.

"U.S. Appl. No. 10/643,585, Amendment and Response filed Mar. 27, 2006 to Non-Final Office Action mailed Sep. 26, 2005", 7 pgs.

"U.S. Appl. No. 10/643,585, Amendment and Response filed Aug. 3, 2006 to Final Office Action mailed Apr. 14, 2006", 9 pgs.

"U.S. Appl. No. 10/643,585, Final Office Action mailed Jan. 25, 2007", 17 pgs.

"U.S. Appl. No. 10/643,585, Final Office Action mailed Apr. 14, 2006", 13 pgs.

"U.S. Appl. No. 10/643,585, Non-Final Office Action mailed Oct. 23, 2006", 12 pgs.

"U.S. Appl. No. 10/643,585, Non-Final Office Action mailed Sep. 26, 2005", 9 pgs.

"U.S. Appl. No. 10/643,585, Notice of Allowance mailed Jun. 11, 2007", 6 pgs.

"U.S. Appl. No. 10/643,585, RCE and Amendment and Response filed Apr. 23, 2007 to Final Office Action mailed Jan. 25, 2007 and the Advisory Action mailed Apr. 2, 2007", 15 pgs.

"U.S. Appl. No. 10/643,585, Request for Continued Examination filed Sep. 14, 2006", 1 pg.

"U.S. Appl. No. 10/643,585, Response to Rule 312 Communication mailed Jul. 23, 2007", 2 pgs.

"U.S. Appl. No. 10/643,727, Non-Final Office Action mailed Feb. 16, 2006", 33 pgs.

"U.S. Appl. No. 10/643,727, Non-Final Office Action mailed Aug. 11, 2006", 29 pgs.

"U.S. Appl. No. 10/643,727, Notice of Allowance mailed Feb. 28, 2007", 5 pgs.

"U.S. Appl. No. 10/643,727, Notice of Allowance mailed Jul. 19, 2007", 5 pgs.

"U.S. Appl. No. 10/643,727, Response filed Jan. 11, 2007 to Non-Final Office Action mailed Aug. 11, 2006", 15 pgs.
"U.S. Appl. No. 10/643,727, Response filed Jun. 15, 2006 to Non-Final Office Action mailed Feb. 16, 2006", 21 pgs.
"U.S. Appl. No. 10/643,738 Response filed Jan. 16, 2006 non-final office acton mailed Sep. 26, 2005", 13 pgs.
"U.S. Appl. No. 10/643,738 Response filed Jul. 19, 2006 non-final office action mailed Feb. 17, 2006", 10 pgs.
"U.S. Appl. No. 10/643,738, Final Office Action mailed Apr. 17, 2007", 12 pgs.
"U.S. Appl. No. 10/643,738, Non-Final Office Action mailed Feb. 17, 2006", 9 pgs.
"U.S. Appl. No. 10/643,738, Non-Final Office Action mailed Sep. 26, 2005", 11 pgs.
"U.S. Appl. 10/643,738, Response filed Jul. 17, 2007 final office action mailed Apr. 17, 2007", 17 PGS.
"U.S. Appl. No. 10/643,741 Final Office Action mailed Sep. 11, 207", 27 pgs.
"U.S. Appl. No. 10/643,741, Non-Final Office Action mailed Apr. 5, 2007", 19 pgs.
"U.S. Appl. No. 10/643,741, Response filed Jun. 4, 2007 to Non-Final Office Action mailed Apr. 5, 2007", 16 pgs.
"U.S. Appl. No. 10/643,742, Non-Final Office Action mailed Jun. 4, 2007", 13 pgs.
"U.S. Appl. No. 10/643,754, Advisory Action mailed Nov. 22, 2006", 3 pgs.
"U.S. Appl. No. 10/643,754, Final Office action mailed Sep. 14, 2006", 21 pgs.
"U.S. Appl. No. 10/643,754, Non-Final Office Action mailed Feb. 8, 2006", 16 pgs.
"U.S. Appl. No. 10/643,754, Non-Final Office Action mailed Jul. 5, 2007", 23 pgs.
"U.S. Appl. No. 10/643,754, Response filed Nov. 7, 2006 to Final Office Action mailed Sep. 14, 2006", 12 pgs.
"U.S. Appl. No. 10/643,754, Response filed Mar. 30, 2007 to Advisory Action mailed Nov. 22, 2006", 10 pgs.
"U.S. Appl. No. 10/643,754, Response filed Jul. 10, 2006 to Non-Final Office Action mailed Feb. 8, 2006", 12 pgs.
"U.S. Appl. No. 10/643,758, Notice of Allowance mailed Jul. 19, 2007", 4 pgs.
"U.S. Appl. No. 10/643,758, Advisory Action mailed May 1, 2007", 3 pgs.
"U.S. Appl. No. 10/643,758, Amendment and Response filed Jul. 10, 2006 to Final Office Action Mar. 10, 2006", 9 pgs.
"U.S. Appl. No. 10/643,758, Final Office Action mailed Feb. 6, 2007", 23 pgs.
"U.S. Appl. No. 10/643,758, Final Office Action mailed Mar. 10, 2006", 13, pgs.
"U.S. Appl. No. 10/643,758, Non-Final Office Action mailed Aug. 15, 2006", 15 pgs.
"U.S. Appl. 10/643,758, Non-Final Office Action mailed Aug. 30, 2005", 8 pgs.
"U.S. Appl. No. 10/643,758, Response filed Jan. 30, 2006 to Non-Final Office Action mailed Aug. 30, 2005", 9 pgs.
"U.S. Appl. No. 10/643,758, Response filed Dec. 14, 2006 to Non-Final Office Action mailed Aug. 15, 2006", 17 pgs.
"U.S. Appl. No. 10/643,758, Response filed Aug. 17, 2007 to Final Office Action mailed Feb. 6, 2007", 25 pgs.
"U.S. Appl. No. 10./643,769 Response filed Jul. 23, 2007 non-final office action mailed Apr. 23, 2007", 12 pgs.
"U.S. Appl. No. 10/643,769, Non-Final Office Action mailed Apr. 23, 2007", 13 pgs.
"U.S. Appl. No. 10/643,754, Amendment & Response filed Oct. 9, 2007 to Non-final OA mailed Jul. 5, 2007", 14 pages.
US 7,243,211, 07/2007, Kohn (withdrawn)

* cited by examiner

DECOUPLED SCALAR/VECTOR COMPUTER ARCHITECTURE SYSTEM AND METHOD

RELATED APPLICATIONS

This application is related to U.S. patent application Ser. No. 10/643,741, entitled "Multistream Processing System and Method", filed on even date herewith; to U.S. patent application Ser. No. 10/643,742, entitled "Decoupled Store Address and Data in a Multiprocessor System", filed on even date herewith; to U.S. patent application Ser. No. 10/643,585, entitled "Latency Tolerant Distributed Shared Memory Multiprocessor Computer", filed on even date herewith; to U.S. patent application Ser. No. 10/643,754, entitled "Relaxed Memory Consistency Model", filed on even date herewith; to U.S. patent application Ser. No. 10/643,758, entitled "Remote Translation Mechanism for a Multinode System", filed on even date herewith; and to U.S. patent application Ser. No. 10/643,741, entitled "Method and Apparatus for Local Synchronizations in a Vector Processor System", filed on even date herewith, each of which is incorporated herein by reference.

FIELD OF THE INVENTION

The present invention is related to vector processing computers, and more particularly to systems and methods for hiding memory latency in a vector processing computer.

BACKGROUND INFORMATION

As processors run at faster speeds, memory latency on accesses to memory looms as a large problem. Commercially available microprocessors have addressed this problem by decoupling address computation of a memory reference from the memory reference itself. In addition, the processors decouple memory references from execution based on those references.

The memory latency problem is even more critical when it comes to vector processing. Vector processors often transfer large amounts of data between memory and processor. In addition, each vector processing node typically has two or more processing units. One of the units is typically a scalar unit. Another unit is a vector execution unit. In the past, the scalar, vector load/store and vector execution units were coupled together in order to avoid memory conflicts between the units. It has been, therefore, difficult to extend the decoupling mechanisms of the commercially available microprocessors to vector processing computers.

What is needed is a system and method for hiding memory latency in a vector processor that limits the coupling between the scalar, vector load/store and vector execution units.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, the coupling together of the various units of a vector processor has made it difficult to extend the decoupling mechanisms used in commercially available microprocessors to vector processing computers. Standard scalar processors often decouple the address computation of scalar memory references and also decouple scalar memory references from scalar execution. The MIPS R10K processor is one example of this approach. A method of extending these concepts to a vector processor is discussed below.

Figure 1:
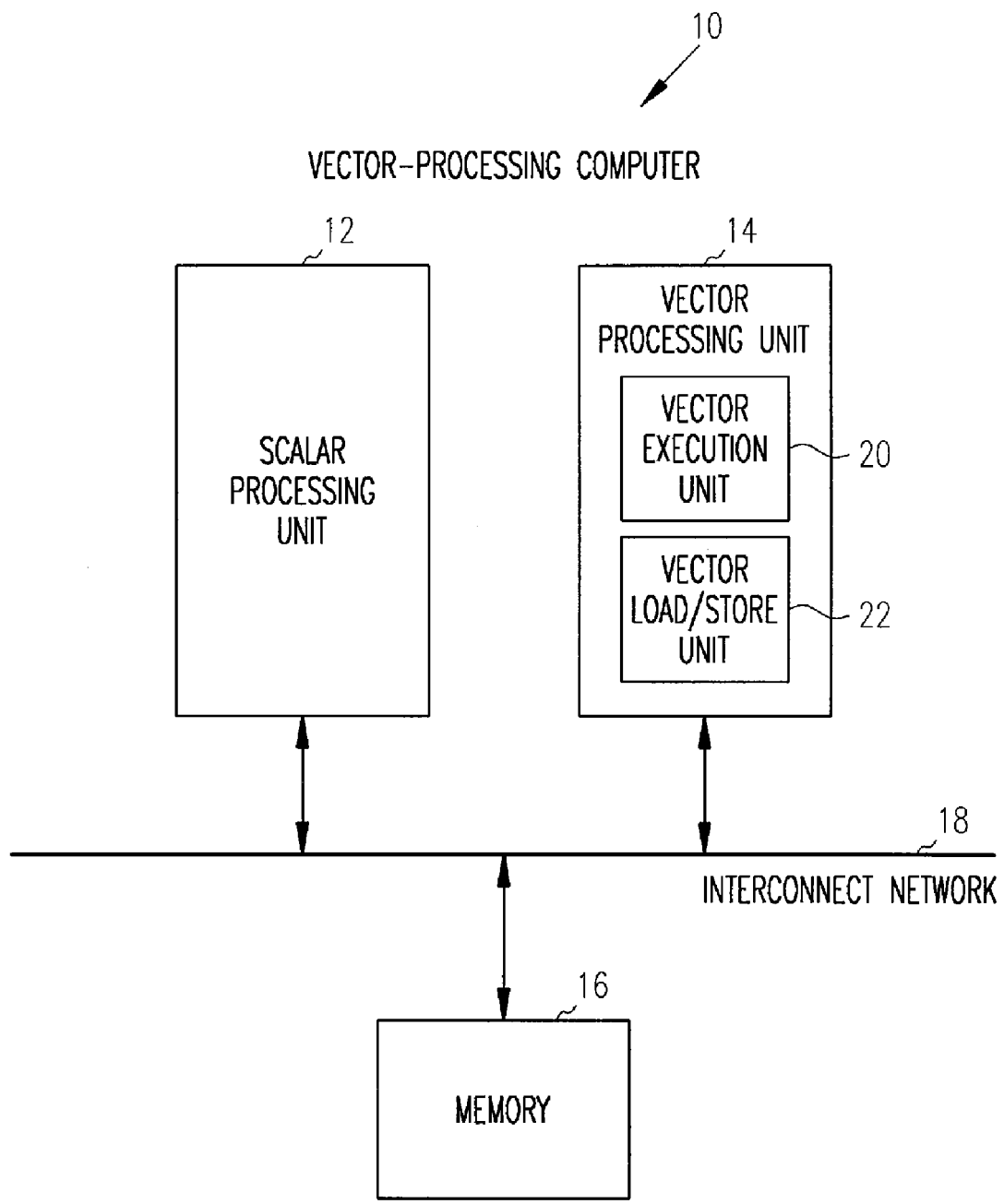
FIG. 1 illustrates a vector processing computer according to the present invention.

A vector processing computer 10 is shown in FIG. 1. Vector processing computer 10 includes a scalar processing unit 12, a vector processing unit 14 and a memory 16. In the example shown, scalar processing unit 12 and vector processing unit 14 are connected to memory 16 across an interconnect network 18. In one embodiment, vector processing unit 14 includes a vector execution unit 20 connected to a vector load/store unit 22. Vector load/store unit 22 handles memory transfers between vector processing unit 14 and memory 16.

The vector and scalar units in vector processing computer 10 are decoupled, meaning that scalar unit 12 can run ahead of vector unit 14, resolving control flow and doing address arithmetic. In addition, in one embodiment, computer 10 includes load buffers. Load buffers allow hardware renaming of load register targets, so that multiple loads to the same architectural register may be in flight simultaneously. By pairing vector/scalar unit decoupling with load buffers, the hardware can dynamically unroll loops and get loads started for multiple iterations. This can be done without using extra architectural registers or instruction cache space (as is done with software unrolling and/or software pipelining).

In one embodiment, both scalar processing unit 12 and vector processing unit 14 employ memory/execution decoupling. Scalar and vector loads are issued as soon as possible after dispatch. Instructions that depend upon load values are dispatched to queues, where they await the arrival of the load data. Store addresses are computed early (in program order interleaving with the loads), and their addresses saved for later use.

In one embodiment, each scalar processing unit 12 is capable of decoding and dispatching one vector instruction (and accompanying scalar operand) per cycle. Instructions are sent in order to the vector processing units 14, and any necessary scalar operands are sent later after the vector instructions have flowed through the scalar unit's integer or floating point pipeline and read the specified registers. Vector instructions are not sent speculatively; that is, the flow control and any previous trap conditions are resolved before sending the instructions to vector processing unit 14.

The vector processing unit renames loads only (into the load buffers). Vector operations are queued, awaiting operand availability, and issue in order. No vector operation is issued until all previous vector memory operations are known to have completed without trapping (and as stated above, vector instructions are not even dispatched to the vector unit until all previous scalar instructions are past the trap point). Therefore, vector operations can modify architectural state when they execute; they never have to be rolled back, as do the scalar instructions.

In one embodiment, scalar processing unit 12 is designed to allow it to communicate with vector load/store unit 22 and vector execution unit 20 asynchronously. This is accomplished by having scalar operand and vector instruction queues between the scalar and vector units. Scalar and vector instructions are dispatched to certain instruction queues depending on the instruction type. Pure scalar instructions are just dispatched to the scalar queues where they are executed out of order. Vector instructions that require scalar operands are dispatched to both vector and scalar instruction queues. These instructions are executed in the scalar unit. They place scalar operands required for vector execution in the scalar operand queues that are between the scalar and vector units. This allows scalar address calculations that are required for vector execution to complete independently of vector execution.

The vector processing unit is designed to allow vector load/store instructions to execute decoupled from vector execute unit 20. The vector load/store unit 22 issues and executes vector memory references when it has received the instruction and memory operands from scalar processing unit 12. Vector load/store unit 22 executes independently from vector execute unit 20 and uses load buffers in vector execute unit 20 as a staging area for memory load data. Vector execute unit 20 issues vector memory and vector operations from instructions that it receives from scalar processing unit 12.

When vector execution unit 20 issues a memory load instruction, it pulls the load data from the load buffers that were loaded by vector load/store unit 22. This allows vector execution unit 20 to operate without stalls due to having to wait for load data to return from main memory 16.

Vector stores execute in both the vector load/store unit 22 and the vector execute unit 20. The store addresses are generated in the vector load/store unit 22 independently of the store data being available. The store addresses are sent to memory 16 without the vector store data. When the store data is generated in vector execute unit 20, the store data is sent to memory 22 where it is paired up with the store address.

The current approach allows scalar computation to execute independently of vector computation. This allows the scalar address and operand computation to execute in parallel, or ahead of the vector instruction stream. In addition, this approach allows vector address generation to execute independently of vector execution. Finally, this approach allows vector memory operations to execute ahead of vector execution, thus reducing memory latency.

This decoupling of the scalar, vector load/store, and vector execution does, however, make synchronizing of scalar and vector data more complex. Computer 10 incorporates specific instructions and hardware that reduce this complexity.

Figure 2:
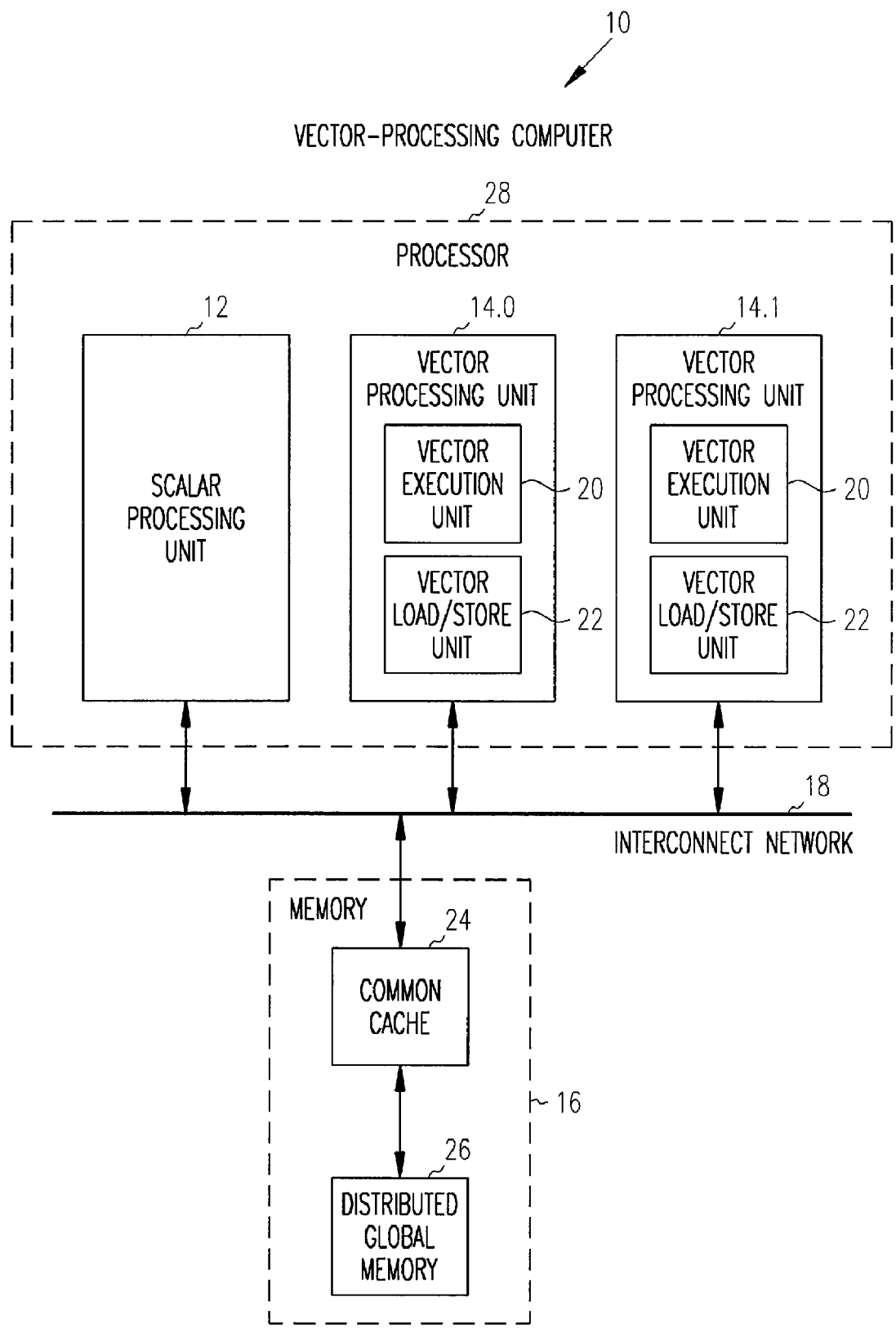
FIG. 2 illustrates an alternate embodiment of a vector processing computer according to the present invention.

An alternate embodiment of vector processing computer 10 is shown in FIG. 2. Vector processing computer 10 in FIG. 2 includes a processor 28. Processor 28 includes a scalar processing unit 12 and two vector processing units (14.0 and 14.1). Scalar processing unit 12 and the two vector processing units 14 are connected to memory 16 across interconnect network 18. In the embodiment shown, memory 16 is configured as cache 24 and distributed global memory 26. Vector processing units 14 include a vector execution unit 20 connected to a vector load/store unit 22. Vector load/store unit 22 handles memory transfers between vector processing unit 14 and memory 16.

Figure 3:
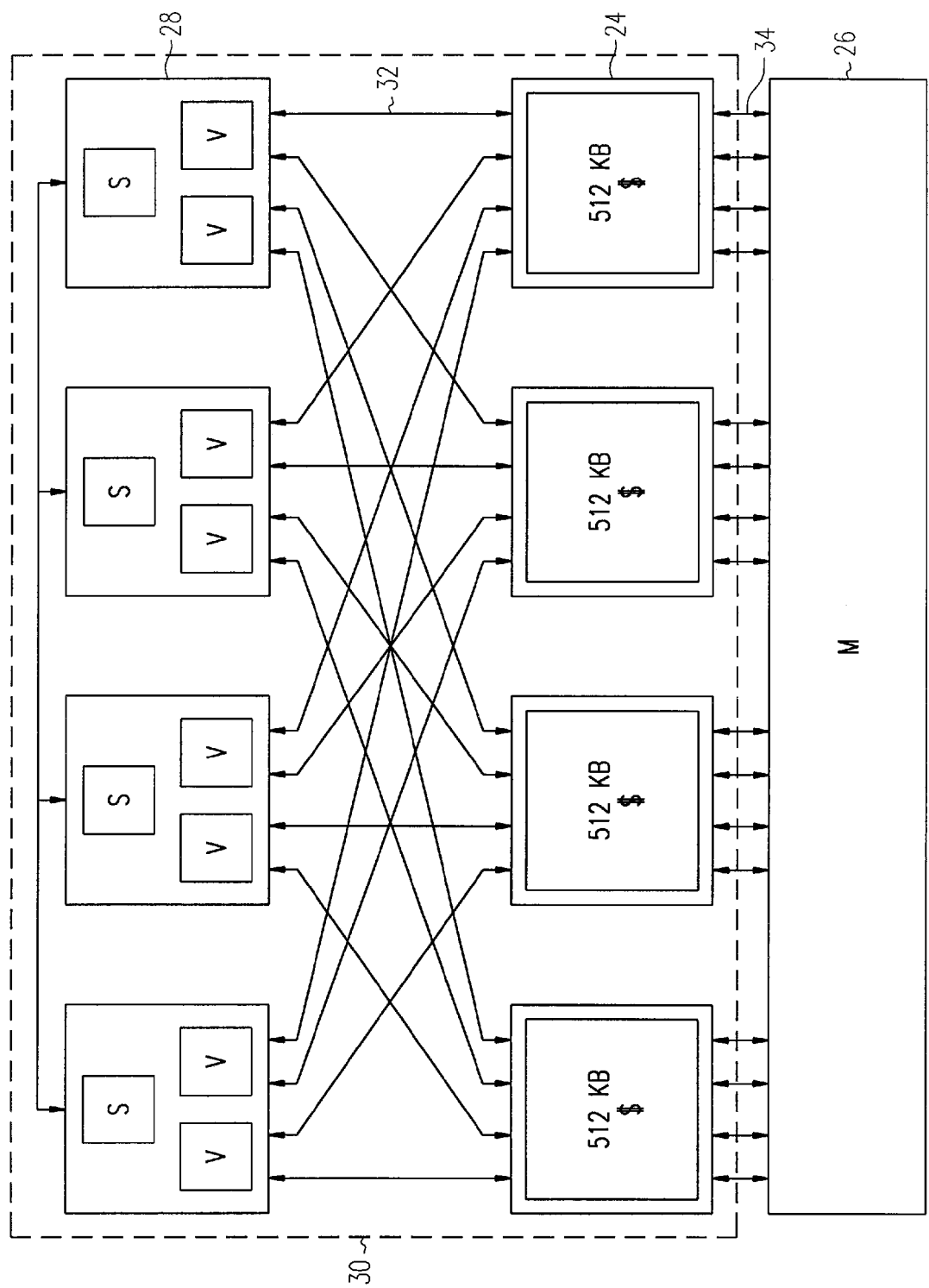
FIG. 3 illustrates yet another embodiment of a vector processing computer according to the present invention.

In one embodiment, four processors 28 and four caches 24 are configured as a Multi-Streaming Processor (MSP) 30. An example of such an embodiment is shown in FIG. 3. In one such embodiment, each scalar processing unit 12 delivers a peak of 0.4 GFLOPS and 0.8 GIPS at the target frequency of 400 MHz. Each processor 28 contains two vector pipes, running at 800 MHz, providing 3.2 GFLOPS for 64-bit operations and 6.4 GFLOPS for 32-bit operations. The MSP 30 thus provides a total of 3.2 GIPS and 12.8/25.6 GFLOPS. Each processor 28 contains a small Dcache used for scalar references only. A 2 MB Ecache 24 is shared by all the processors 28 in MSP 30 and used for both scalar and vector data. In one embodiment processor 28 and cache 24 are packaged as separate chips (termed the "P" chip and "E" chips, respectively).

In one embodiment, signaling between processor 28 and cache 24 runs at 400 Mb/s on processor-cache connection 32. Each processor to cache connection 32 shown in FIG. 3 uses an incoming 64-bit path for load data and an outgoing 64-bit path for requests and store data. Loads can achieve a maximum transfer rate of 51 GB/s from cache 24. Stores can achieve up to 41 GB/s for stride-one and 25 GB/s for non-unit stride stores.

In one embodiment, global memory 26 is distributed to each MSP 30 as local memory 48. Each Ecache 24 has four ports 34 to M chip 42 (and through M chip 42 to local memory 48 and to network 38). In one embodiment, ports 34 are 16 data bits in each direction. MSP 30 has a total of 25.6 GB/s load bandwidth and 12.8-20.5 GB/s store bandwidth (depending upon stride) to local memory.

Figure 4:
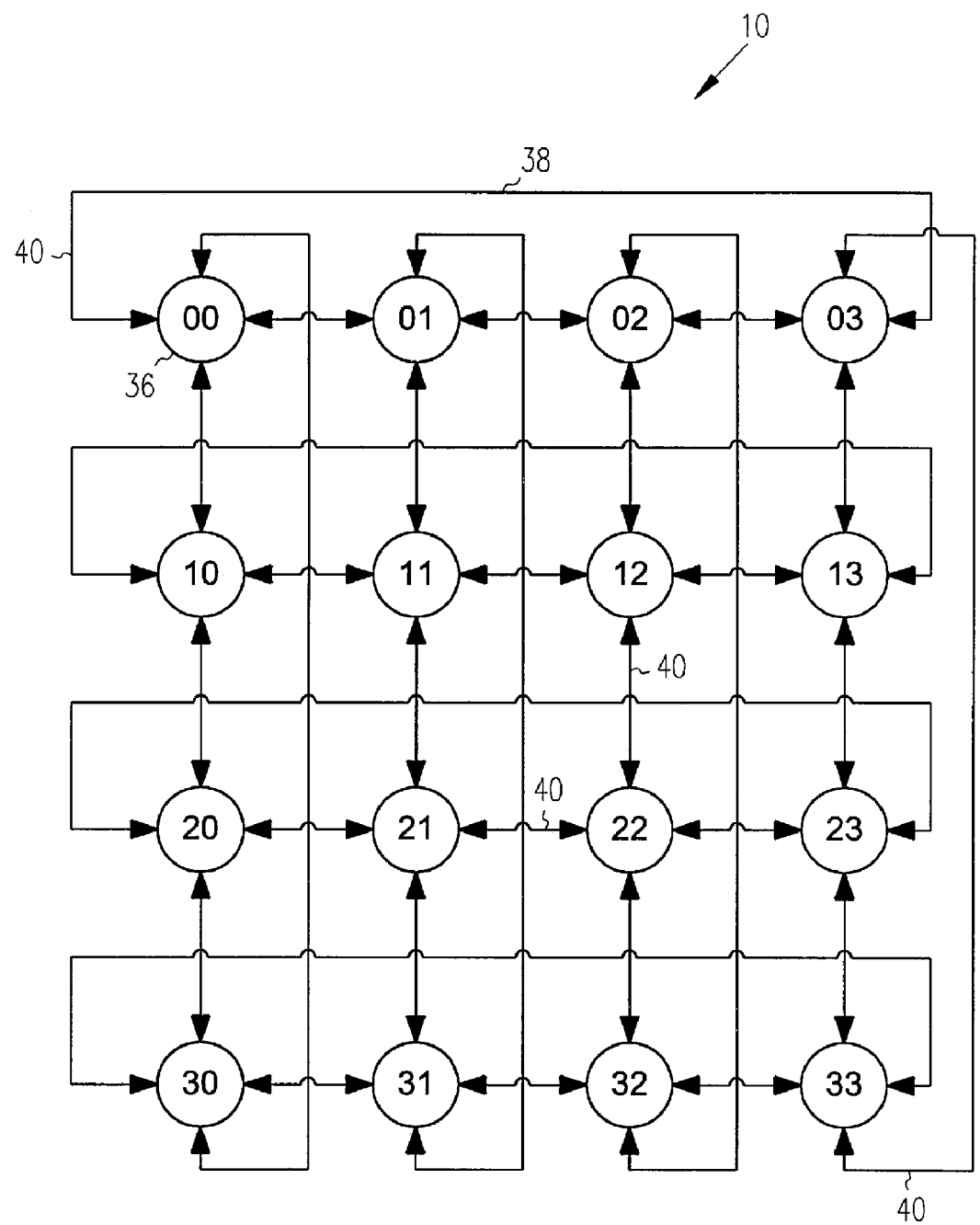
FIG. 4 illustrates a multiprocessing computer system according to the present invention.

In one embodiment, each system 10 includes a plurality of nodes 36 interconnected with a network 38. In one embodiment, as is shown in FIG. 4, network 38 includes high-speed links 40 used to connect nodes 36 either as a hypercube or as a torus. Other approaches for interconnecting nodes 36 could be used as well.

Figure 5:
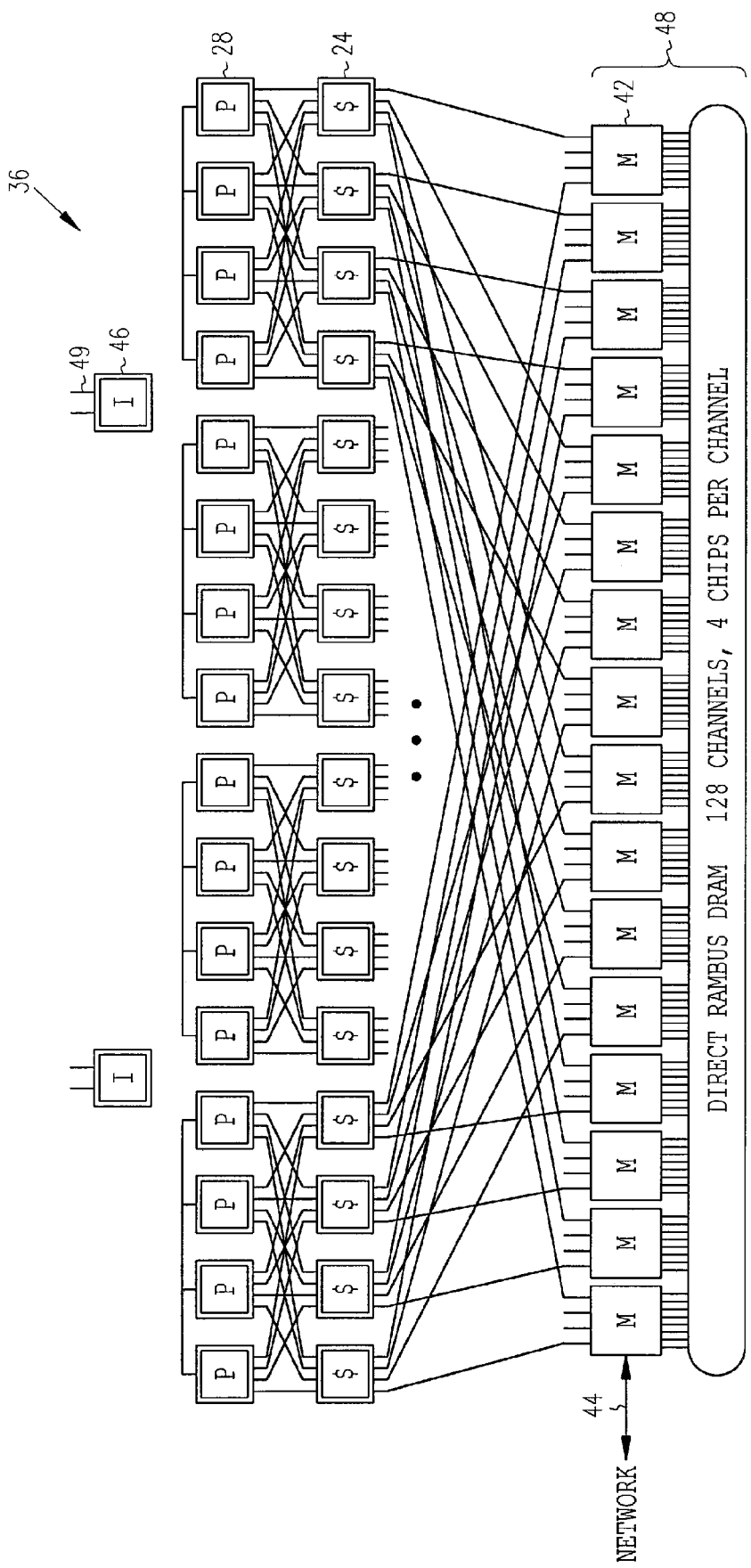
FIG. 5 illustrates a node which could be used in the multiprocessor computer system of FIG. 4.

In one embodiment, each node 36 consists of four MSPs 30 and sixteen M chips 42, as shown in FIG. 5. M chips 42 contain memory controllers, network interfaces and cache coherence directories with their associated protocol engines. In one such embodiment, memory 26 is distributed round-robin by 32-byte cache lines across the sixteen M chips 42 at each node 36. Thus, the M chip for a particular address is selected by bits 8 . . . 5 of the physical address.

Each E chip is responsible for one fourth of the physical address space, determined by bits 5 and 6 of the physical address. A reference to a particular line of memory is sent to the associated E chip where the Ecache is consulted, and either the line is found in the Ecache or the request is sent on to an M chip. Bits 7 and 8 of the physical address select one of four M chips connected to each E chip.

Each M chip 42 resides in one of sixteen independent slices of the machine, and the interconnection network 38 provides connectivity only between corresponding M chips on different nodes (thus there are sixteen parallel, independent networks). All activity (cache, memory, network) relating to a line of memory stays within the corresponding system slice.

Each M chip 42 contains two network ports 44, each 1.6 GB/s peak per direction. This provides a total peak network bandwidth of 51.2 GB/s in and 51.2 GB/s out. Single transfers to/from any single remote destination will use only half this bandwidth, as only one of two ports 44 per M chip 42 will be used. Also, contention from the other processors 28 on node 36 must be considered. Lastly, all inter-node data is packetized, resulting in a smaller ratio of sustained to peak than in the local memory subsystem. Protocol overheads vary from 33% (one way, stride-I reads) to 83% (symmetric, non-unit-stride reads or writes).

Each node 36 also contains two I/O controller chips 46 ("I" chips) that provide connectivity between the outside world and network 38 and memory 26. In one embodiment, each "I" chip 46 provides two XIO (a.k.a. Crosstalk) I/O channels 49, with a peak speed bandwidth of 1.2 GB/s full duplex each. The I chips are connected to each other and to the sixteen M chips 36 with enough bandwidth to match the four XIO channels.

This partitioning provides low latency and high bandwidth to local memory 48. With a local memory size of up to 16 GB (64 GB once 1 Gbit chips become available), most single-processor and autotasked codes should run locally, and most references in distributed-memory codes will be satisfied locally as well. Latency to remote memory will depend upon the distance to the remote node, and the level of contention in network 38.

In one embodiment, a limited operating system executes on each node, with a Unicos/mk-like layer across nodes 30. The limited OS will provide basic kernel services and management of two direct-attached I/O devices (a disk array and network interface). All other I/O connectivity is provided by a separate host system. In one such embodiment, the host system also provides the user environment (shell, cross compilers, utility programs, etc.), and can be used to run scalar compute applications.

Figure 6:
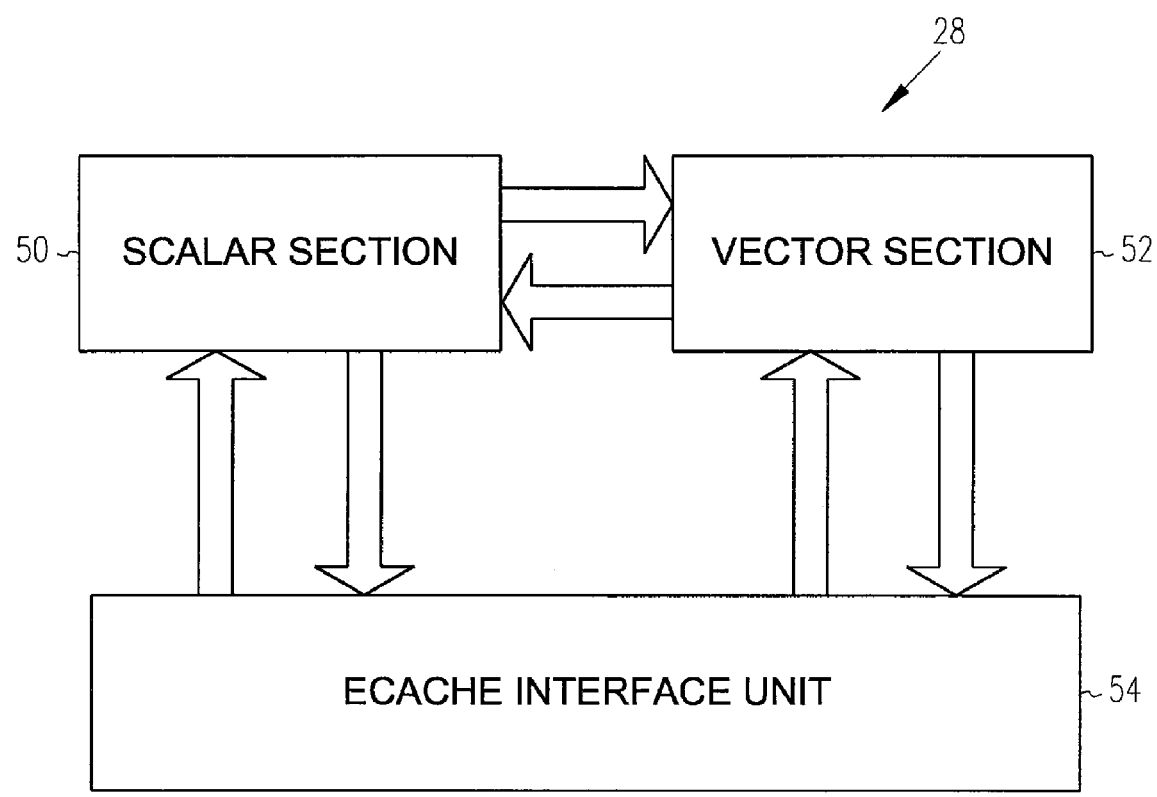
FIG. 6 illustrates a processor which could be used in the node of FIG. 5.

One embodiment of processor 28 is shown in FIG. 6. In the embodiment shown, processor 28 includes three sections: a scalar section (SS) 50, a vector section (VS) 52 and an ecache interface unit (EIU) 54.

EIU 54 is the cache/network interface; it operates to ensure high bandwidth between the SS/VS and cache 24.

Figure 7:
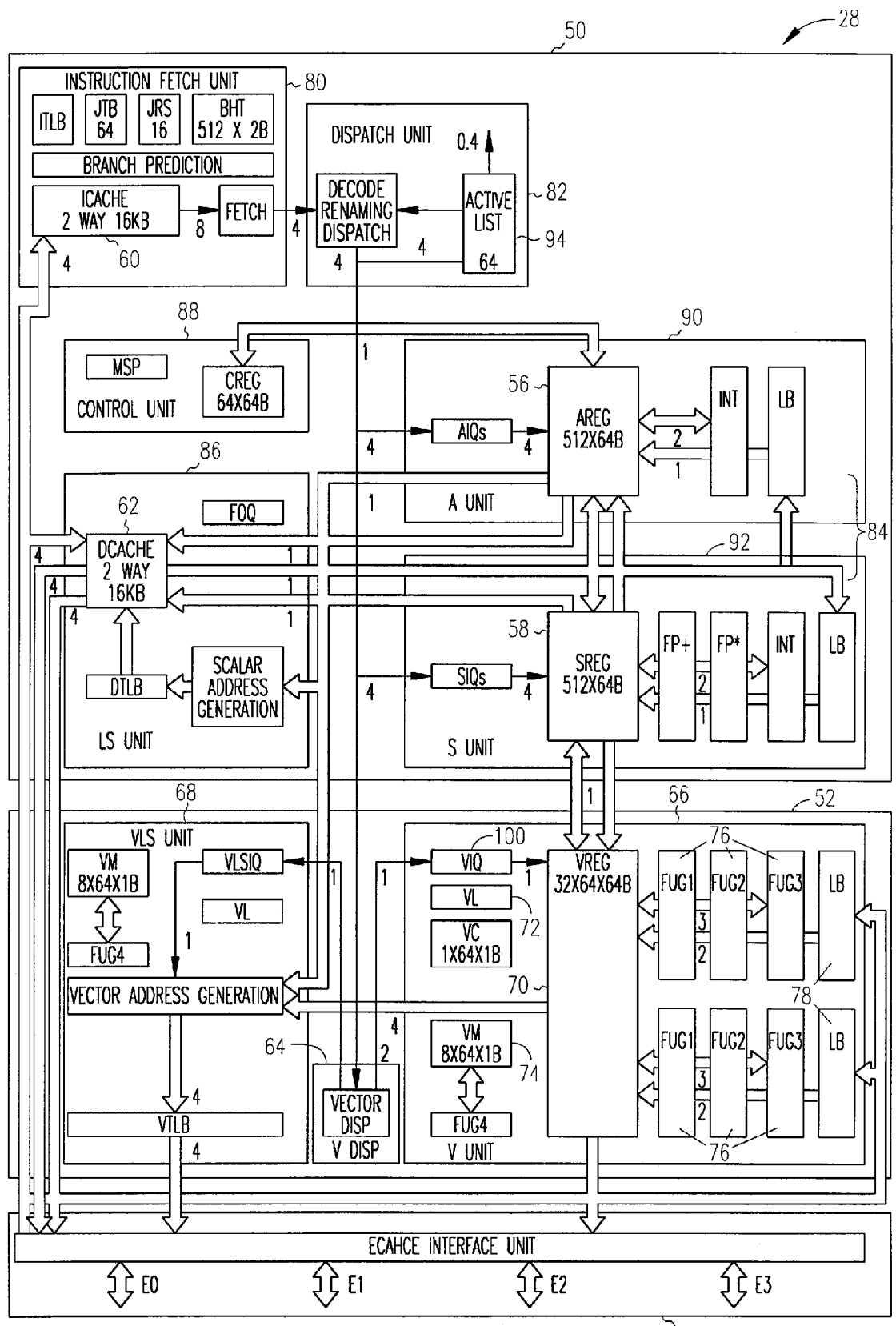
FIG. 7 is a more detailed description of a processor which could be used in the node of FIG. 5.

A more detailed example of one embodiment of processor 28 is shown in FIG. 7. In the embodiment shown in FIG. 7, SS 50 includes a Instruction Fetch Unit (IFU) 80, a Dispatch Unit (DU) 82, an AS Unit (ASU) 84, a Load/Store Unit (LSU) 86, and a Control Unit (CU) 88. AS Unit 84 includes A Unit 90 and S Unit 92. In one such embodiment, SS 50 implements an out-of-order, 2-way issue superscalar processor.

VS 52 implements a two pipe vector processor capable of executing eight floating-point operations and 4 memory operations per Lclk. VS 52 includes a Vector Dispatch Unit (VDU) 64, a Vector Unit (VU) 66 and a Vector Load/Store Unit (VLSU) 68.

In one embodiment, SS 50 is a high performance superscalar processor that implements many of today's RISC superscalar features. It can dispatch, in-order, up to two instructions per Lclk, can then execute instructions out-of-order within the various units, and then graduate in-order up to two instructions per Lclk. The SS also implements speculative execution, register renaming, and branch prediction to allow greater out-of-order execution. The SS can predict up to two branch instruction and uses a Branch History Table (BHT), a Jump Target Buffer (JTB), and Jump Return Stack (JRS) to help insure a high branch prediction rate.

SS 50 also contains two 64-bit wide register files, A Registers (AR) and S Registers (SR) 58. The ARs are used mainly for address generation. In one embodiment, there are 64 logical ARs and 512 physical ARs that are renamed within A Unit 90. The SRs are used for both integer and floating-point operations. In one embodiment, there are 64 logical SRs and 512 renamed physical SRs within S Unit 92.

As noted above, SS 50 is capable of issuing up to two integer operations per Lclk using the ARs. In addition, SS 50 is capable of issuing one SR instruction per Lclk that can be either integer or floating point. The decoupled LSU of the SS can issue, in order, one load or store per Lclk which may then execute out-of-order with respect to previous scalar memory operations. The SS unit is also able to issue one branch instruction per Lclk, which allows one branch prediction to be resolved per Lclk.

The SS includes separate first level of caches for instructions and scalar data. SS Instruction Cache (Icache) 60 is 16 KBytes in size and is two-way set associative. Each Icache line is 32 Bytes. Data Cache (Dcache) 62 is also 16 KBytes and two-way set associative with a 32 Byte line size. Icache 60 is virtually indexed and virtually tagged while Dcache 62 is virtually indexed and physically tagged. In one embodiment, Dcache 62 is write through.

SS 50 supports virtual memory addressing by maintaining precise exceptions for address translation errors on both scalar and vector memory references. Floating-point exceptions and other errors are not precise.

VS 52 is a two pipe vector processor that executes operations at the Sclk rate. Control for VS 52 executes at the LClk rate. In one embodiment, VS 52 consists of three units, VDU 64, VU 66 and VLSU 68, that are all decoupled from SS 50 and are also decoupled from each other. VDU 64 receives instruction from the DU of SS 50 and couples required scalar operands with these vector operations. The VDU then dispatches these vector instructions to the VU and VLSU. This allows scalar address generation for vector memory references to execute ahead of the vector operations and also permits the VLSU to run ahead of the VU. This decoupling, similar to modem RISC CPUs, helps VS 52 conceal latency to both Ecache 24 and memory system 26.

VU 52 contains the large Vector Register (VR) file 70, which can operate in two widths, 32-bits or 64-bits. There are 32 logical and 32 physical VRs 70 that have a Maximum Vector Length (MaxVL) of 64 elements. No register renaming is performed on the VRs. When performing 32-bit operations, the VRs are 32-bits wide and when executing 64-bit operations the VRs are 64-bits wide. For both widths of operations, the MaxVL of the VRs remains at 64 elements. The VU also contains a Vector Carry Register (VC) that is 1-bit wide and MaxVL elements long. This register is used to support extended integer arithmetic.

The VU contains two other register sets that are used to control the vector operations of both the VU and VLSU. A Vector Length Register (VL) 72 is a single 64-bit register that contains a value between 0 and MaxVL. The VL serves to limit the number of operations a vector instruction performs. The VS also includes eight Vector Mask Registers (VM) 74 which are each 1-bit wide and MaxVL elements long. VMs 74 are used to control vector instructions on a per element basis and can also contain the results of vector comparison operations.

VU 66 is capable of issuing, in order, one vector operation per Lclk. The VU contains two copies, one for each vector pipe, of three Functional Groups (FUG s) 76, that are each capable of executing one operation per Sclk. Each FUG 76 consists of multiple functional units that share data paths to and from VRs 70. The FUGs 76 contain both integer and floating-point function units. Vector chaining is supported between the FUGs and writes to memory 26 but is not supported for reads from memory 26. Most 32-bit vector operations will be performed at twice the rate of 64-bit vector operations.

VLSU 68 performs all memory operations for VS 52 and is decoupled from VU 66 for most operations. This allows VLSU 68 to load vector memory data before it is used in the VU. The VLSU can issue, in order, one instruction per Lclk. The VLSU can generate four memory operations per Lclk. In one embodiment, the four addresses can be for stride loads, gathers, stride stores, or scatters.

To support decoupling of VLSU 68 from VU 66, VS 52 also contains a large Load Buffer (LB) 78. In one embodiment, LB 78 is a 512 64-bit element buffer. That is, there are eight vector-register-equivalent buffers that can be used as a staging area for vector loads. Memory load data is placed in LB 78 by VLSU 68 until VU 66 has determined that no previous memory operations will fault. VU 66 then moves the load data from LB 78 into the appropriate VR 70. In one embodiment, VLSU 68 rotates through the eight load buffers 78 as needed. On a Vector Translation Trap, the load buffer contents are ignored and the vector load instructions associated with the data in the load buffers are restarted.

In one embodiment, AU 90 includes a load buffer used to decouple a scalar load from a scalar operation. In one embodiment, SU 92 includes a load buffer used to decouple a scalar load from a scalar operation.

In one embodiment, VS 52 includes support for vector register renaming in a manner similar to that discussed for SS 50 above.

VS also supports virtual memory addressing by maintaining precise exception state for vector address translation errors.

EIU 54 maintains a high bandwidth between a P Chip 28 and E Chips 24. In one embodiment, EIU 54 is capable of generating a maximum of four memory references per Lclk to the E Chips 24 and can also receive up to four Dwords of data back from the E Chips 24 per Lclk.

EIU 54 supplies instructions to Icache 60 that are fetched from E Chips 24. EIU 54 also controls all scalar and vector memory requests that proceed to E Chips 24. The EIU contains buffering that allows multiple scalar and vector references to be queued to handle conflicts when multiple references request the same E Chip in a single LClk.

EIU 54 also cooperates with DU 82, LSU 86 and VLSU 68 to ensure proper local synchronization of scalar and vector references. This requires that EIU 54 have the capability to invalidate vector store addresses that are resident in Dcache 62.

Instruction Flow

All instructions flow through the processor 28 by first being fetched by IFU 80 and then sent to DU 82 for distribution. In the DU, instructions are decoded, renamed and entered in order into Active List (AL) 94 at the same time that they are dispatched to AU 90, SU 92 and VDU 64.

In one embodiment, a 64 entry AL 94 keeps a list of currently executing instructions in program order, maintaining order when needed between decoupled execution units. Instructions can enter AL 94 in a speculative state—either branch speculative or trap speculative or both. A branch speculative instruction is conditioned on a previous branch prediction. An instruction is trap speculative if it or any previous instruction may trap. Speculative instructions may execute, but their execution cannot cause permanent processor state changes while speculative.

Instructions in the AL proceed from speculative to scalar committed, to committed, to graduated. The AL uses two bits to manage instruction commitment and graduation: trap and complete. An instruction that may trap enters the AL with its trap bit set and complete bit clear. The trap bit is later cleared when it is known the instruction will not trap. Both the trap and complete bits are set for a trapping instruction.

A scalar committed instruction is not branch speculative, will not generate a scalar trap, and all previous scalar instructions will not trap. Scalar commitment is needed for the Vector Dispatch Unit (VDU) to dispatch vector instructions to VU and VLSU. Instructions proceed from being scalar committed to committed.

Committed instructions are not branch speculative, will not trap, and all previous instructions will not trap. After commitment, an instruction proceeds to graduation and is removed from the AL. An instruction may only graduate if it and all previous instructions in the AL are marked complete and did not trap. In one embodiment, the AL logic can graduate up to four instructions per LClk. Scalar shadow registers are freed at graduation and traps are asserted at the graduation point. Instructions cannot be marked complete until it can be removed from the AL. That requires at the least that all trap conditions are known, all scalar operands are read, and any scalar result is written. Some vector instructions are marked complete at dispatch, others at vector dispatch, and the remaining vector instructions are marked complete when they pass vector address translation.

Scalar instructions are dispatched by DU 82 in program order to AU 90 and/or to SU 92. Most scalar instructions in the AU and SU are issued out-of-order. They read the AR or SR, execute the indicated operations, write the AR or SR and send instruction completion notice back to the DU. The DU then marks the instruction complete and can graduate the scalar instruction when it is the oldest instruction in the AL.

All scalar memory instructions are dispatched to AU 90. The AU issues the memory instructions in-order with respect to other scalar memory instructions, reads address operands from AR 56 and sends the instruction and operands to LSU 86. For scalar store operations, the memory instruction is also dispatched to the AU or SU to read the write data from the AR or SR and send this data to LSU 86.

The LSU performs address translation for the memory operations received from the AU in-order, sends instruction commitment notice back to the DU, executes independent memory operations out-of-order. For scalar loads, when load data is written into the AR or SR, the AU or SU transmits instruction completion notice back to the DU. Scalar store instruction completion is sent by the EIU 54 to the DU when the write data has been sent off to cache 24.

Branch instructions are predicted in the IFU before being sent to the DU. The DU dispatches the branch instruction to either the AU or SU. The AU or SU issues the instruction, reads AR or SR, and sends the operand back to the IFU. The IFU determines the actual branch outcome, signals promote or kill to the other units and sends completion notice back to the DU.

The IFU supplies a stream of instructions to Dispatch Unit (DU) 82. This stream of instructions can be speculative because the IFU will predict the result of branches before the outcome of the branch is resolved. AU 90 and SU 92 communicate with the IFU to resolve any outstanding predicted branches. For branch instructions that are predicted correctly, the branch instruction is simply promoted by the IFU. For branch mispredictions, the IFU will signal a mispredict to the other units, restart fetching instructions at the correct instruction address and supply the proper instruction stream to the DU.

Instructions can enter the AL speculated on one or two previous branch predictions. Each instruction is dispatched with a two bit branch mask, one for each branch prediction register. Instructions can be dependent on either or both branch prediction. A new branch prediction is detected at the point in the instruction dispatch stream where a branch mask bit is first asserted. A copy of the AL tail pointer is saved on each new branch prediction. If the branch is later killed, the tail pointer is restored using the saved copy.

At most one new prediction can be dispatched per clock cycle. All predictions are either promoted or killed by the Branch Prediction Logic (BPL). There can be two promotions in a LClk, but only one branch kill. If there are two outstanding branches, a kill of the older prediction implies a kill of the younger branch prediction. The tail will be restored using the saved tail from the older branch prediction, while the saved tail from the younger prediction is discarded.

Another responsibility of the AL logic is to maintain memory consistency. The AL logic orders memory references in the LSU and VLSU, it informs the LSU when scalar memory references have been committed so references can be sent to memory, and the AL logic communicates with other units to perform memory synchronization instructions. The AL logic uses the AL to perform these tasks.

Because of a potential deadlock, no vector store reference can be sent to memory prior to a scalar or vector load that is earlier in program order. Vector load to vector store ordering is done by a port arbiter in EIU 54 while the AL is used to enforce scalar load to vector store ordering.

A scalar load will have a reference sent bit set in the AL if the load hits in the Dcache, or when the port arbiter in the EIU acknowledges the scalar load. The AL has a "reference sent" pointer. This pointer is always between the graduation and scalar commit pointers. The reference sent pointer will advance unless the instruction it points to is a scalar load without its reference sent bit set. When the pointer advances past a vector store instruction, it increments a vector store counter in the VLSU. A non-zero count is required for the VLSU to translate addresses for a vector store reference. The vector store counter is decremented when vector memory issue starts translation of addresses for a vector store instruction.

Scalar loads are initially dispatched in the may trap state. If the address generation and translation in the LSU results in either a TLB miss or an address error, the complete bit is set, indicating a trap. If translation passes, the trap bit is cleared. Scalar loads to non-I/O space may be satisfied in the Dcache or make memory references immediately after successful address translation. The instruction will later complete when the memory load data is written to a physical register. Scalar load references may bypass previous scalar stores provided the loads are to different addresses.

Prefetch instructions are initially dispatched to the LSU in the may trap state but never generate a trap. The trap bit is always cleared and complete bit set after address translation in the LSU. If the address translation was unsuccessful, the prefetch instruction acts as a NOP, making no Dcache allocation or memory reference.

Vector instructions are dispatched in-order from DU 82 to VDU 64. VDU 64 dispatches vector instructions to both VU 66 and VLSU 68 in two steps. First, all vector instructions are vpredispatched in-order in the VDU after all previous instructions are scalar committed. The VDU separates the stream of vector instructions into two groups of vector instructions, the VU instructions and VLSU instructions. All vector instructions are sent to the VU, but only vector memory instructions and instructions that write VL and VM sent to the VLSU.

Figure 8A:
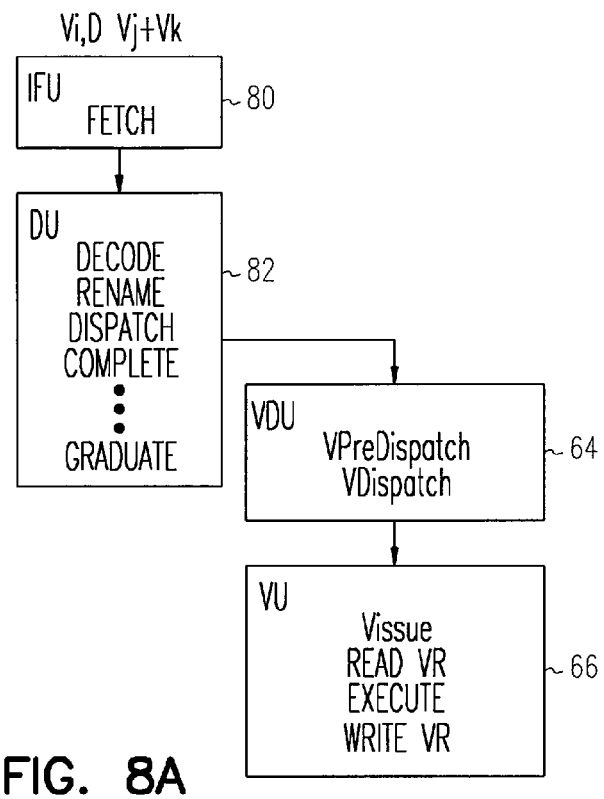
FIGS. 8a-8c illustrate instruction flow for vector instructions according to the present invention.

Vector instructions that are not vector memory instructions or require no scalar operands are marked complete by the DU at dispatch. An example of the instruction flow of such a vector instruction is shown in FIG. 8*a*. This instruction class can then graduate from the active list before the VDU has vdispatched them to the VU.

Figure 8B:
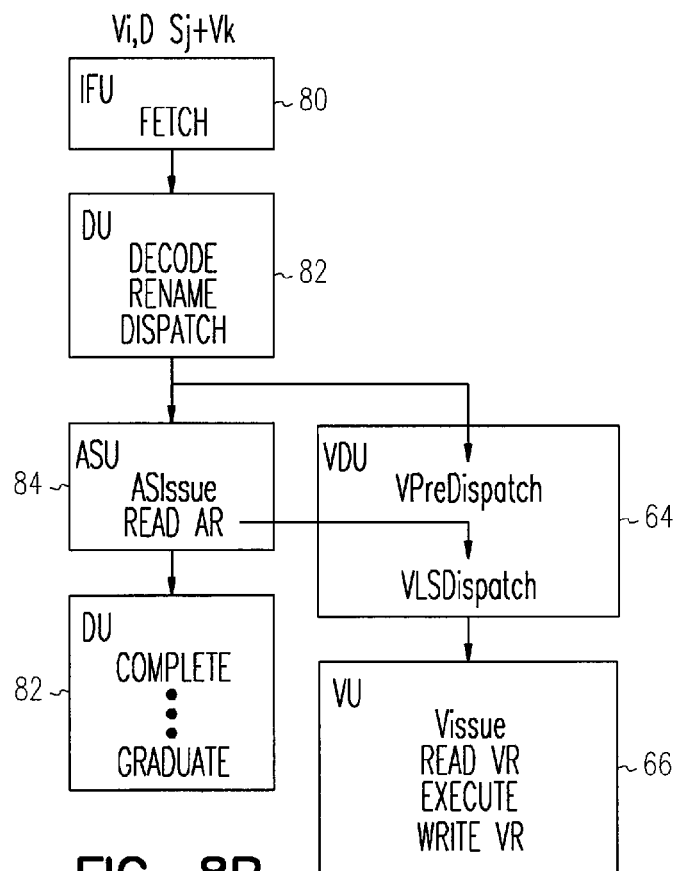

For vector instructions that require scalar operands, the DU also dispatches the vector instructions to the AU and/or SU. An example of the instruction flow of such a vector instruction is shown in FIG. 8*b*. The vector instruction is issued out-of-order in the AU and/or SU, then reads AR and/or SR, and finally sends the scalar operand(s) to the VDU where it is paired with the vector instruction. VDU 64 then vdispatches the instruction and data in-order to the VU. Vector instructions that are not memory instructions but do require scalar operand(s), are marked complete in the AL when the scalar operand(s) have been read in the AU and/or SU.

Vdispatch and vlsdispatch are decoupled from each other. For vector instructions that are forwarded to the VLSU, the VDU collects all required scalar operands and vlsdispatches the instruction and data in-order to the VLSU.

Figure 8C:
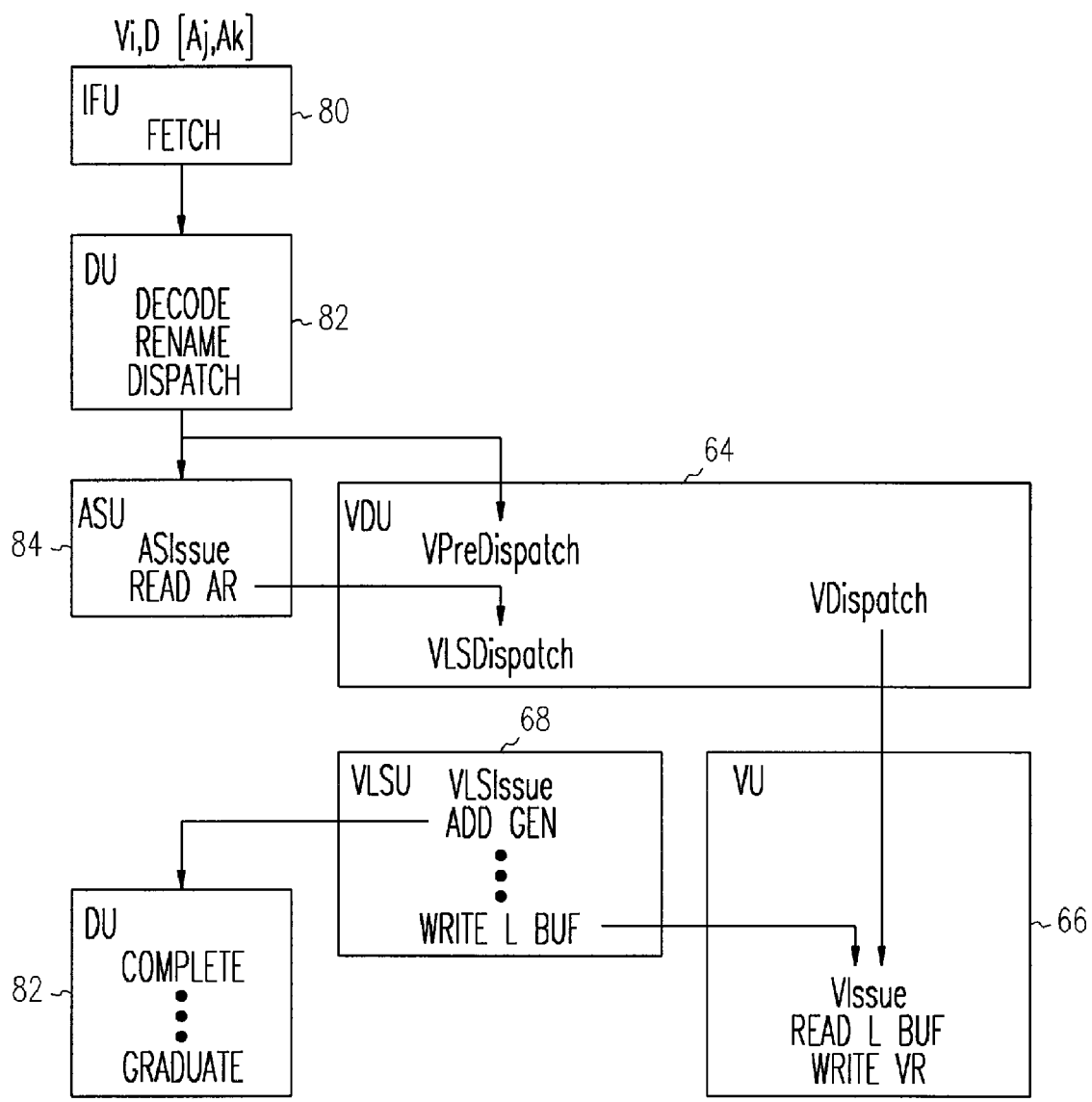

Vector memory instructions are dispatched to both the VU and VLSU. An example of the instruction flow of such a vector instruction is shown in FIG. 8*c*. Vector memory operations execute in the VLSU decoupled from the VU and send vector memory instruction completion notices back to the DU after vector address translation.

If a vector memory instruction results in a translation fault, VLSU 68 asserts a Vector Translation Trap. The instruction in DU 82 reaches the commit point but it won't pass the commit point. It stays there and the rest of the instructions move along and all graduate.

Instructions are not allowed to modify the permanent architectural state until they graduate. Since the instruction that caused the translation fault is not allowed to graduate, you have a clear indication of where to restart. The operating system patches up the memory and the program gets restarted at that point.

Errors in the VU are handled differently. The vector execution unit makes all of its references and all of its instructions in order so, if it has a fault, it just stops.

For vector load instructions, the VU issues the vector memory instruction in-order after address translation has completed in the VLSU and all load data has returned from the memory system. Next, the VU reads data from the LB and writes the elements in the VR.

For vector store instructions, the VU waits for completion of address translation in the VLSU, issues the store instruction, and reads the store data from the VR.

For non-memory instructions, the VU issues the vector instruction in-order, reads VR(s), executes the operation in the VU's two vector pipes and writes the results into the VR.

Instructions are dispatched to AU 90, SU 92 and VDU 64 by DU 82. The DU will dispatch one class of instructions to only one unit, other instructions to two units, and other instruction types to all three units.

In one embodiment, DU 82 receives a group of eight instructions from IFU 80 per LClk. Only one of these instructions can be a branch or jump instruction. Some of these instructions in the group may be invalid.

The DU decodes the instruction group, determines register dependencies, renames instructions that require renaming, dispatches up to four instructions per LClk to the AU, SU, and/or VDU, and then tracks the state of the instructions in the execution units. Outgoing instructions are queued in the AU, SU, and VDU instruction queues. When instructions have completed in the execution units, the DU is informed and the instructions are graduated in order.

Decode Logic (DL) in the DU receives up to eight valid instructions from the IFU per LClk. This instruction group is aligned to a 32-Byte boundary. Some of the instructions may not be valid because of branch and jump instructions within the group of eight instructions. A control transfer to a instruction within a group of eight, will have the instructions before the target instruction invalid.

The DL can decode up to 4 instructions per LClk. These instructions must be naturally aligned on 16-Byte boundaries. The DL will determine, for each instruction, the instruction attributes, instruction register usage, and instruction destinations for dispatch. The DL will then advance this decoded information to the register renaming logic.

Renaming Logic (RL) in the DU accepts up to 4 decoded instructions from the DL per LClk. The RL determines instruction register dependencies and maps logical registers to physical registers. The AR and SR operand registers of the instructions in the group are matched against the AR and SR result registers of older instructions. This means that the operands must be compared to older instructions within the instruction group and also to older instructions that have already be renamed in earlier LClks.

The RL uses a simpler method for register renaming than true general register renaming. This method is termed Register Shadowing. In register shadowing, AU 90 and SU 92 use RAM in their respective units for AR 56 and SR 58, respectfully. The logical AR/SR are mapped to the physical elements of the RAM to allow 8 specific physical elements of the RAM per logical AR/SR. This means that logical A5 will be mapped to only one of eight physical registers (A5, A69, A133, A197, A261, A325, A389, A453). Logical A0 and S0 will never be renamed because they are always read as zero.

The mapping of logical registers to physical registers for each AR and SR is maintained by a 3-bit user invisible Shadow Pointer (SP) for each logical register (SP_A0_SP_A63, SP_S0-SP_S63). At reset all SPs are cleared to zero.

When a AR/SR is used as an operand in a instruction, the SP of that register is used to determine the current physical register. This physical register number is then used as the operand register when the instruction executes in one of the execution units.

When an AR/SR is used as a result register, the SP is incremented by one to point to a new physical register. This physical register will then be written to when the instruction executes in one of the execution units. For any instructions after this instruction that use the same logical register as an operand, it will be mapped to this new physical register.

To control the renaming of the physical registers, each AR/SR logical register is mapped to a 3-bit user invisible Free Shadow Count (FC) register (FC_A0-FC_A63, FC_S0-FC_S63). At reset the FC registers are set to seven. For each assignment of a new physical register, the associated FC register is decremented by one. Each time an instruction is graduated that assigned a new physical register, the associated FC for that logical register is incremented by one. If the RL tries to rename a logical register that has a FC of zero, the RL holds this instruction and all younger instructions in the group until a physical register is free by graduating an instruction that assigned a physical register to that logical register.

The RL also controls the remapping of physical registers to logical registers after a branch mispredict. The RL needs to have the capability of restoring the mapping back to the mapping at the time of the branch instruction that was mispredicted. The RL accomplishes this by maintaining two user invisible 3-bit Branch Count registers (BC0, BC1) for each AR and SR. Each BC is associated with one of the two possible outstanding branch predictions.

The BCs count the number of allocations that have been made to a specific logical register since the predicted branch instruction. For each speculative physical register assignment after the speculative branch instruction, the current BC for that speculative branch and logical register is incremented by one. If a second branch is encountered before the first branch is resolved, the other 64 BC registers are incremented for register allocation.

When the outcome of a speculative branch is resolved, the SP, FC, BC0 and BC1 registers for all ARs and SRs may be modified. For branches that are predicted correctly, the associated BC is cleared to zero. For branches that are predicted incorrectly, the FC registers are incremented by the amount in both the BC0 and BC1 registers, the SP registers are decremented by the amount in both the BC0 and BC1 registers, and both BC0 and BC1 registers are cleared to zero. This restores the logical to physical mapping to the condition before the speculative branch.

The other circumstance where the RL needs to restore the register mapping is when a precise trap is taken. This could be for scalar or vector loads or stores that have a TLB exception. To recover back to the renamed state of the trapping instruction, the SP registers are set equal to the current contents of the SP registers minus seven plus the associated FC register. The FC registers are then set to seven, and the BC0 and BC1 registers are cleared.

Vector Operation

VDU 64 controls the vector instruction flow to VU 66 and VLSU 68. No branch speculative or scalar speculative vector instructions are sent to the VU or VLSU from the VDU. Because no scalar speculative vector instructions are sent to the VU and VLSU, the vector units do not have to support a precise trap due to a previous scalar instruction that trapped in SS 50.

The VDU performs five functions. The first role of the VDU is to enforce the scalar commitment of previous scalar instructions. The second action of the VDU is to separate the vector instruction stream into two streams of instructions: VU instructions and VLSU instructions. The third role of the VDU is to establish the communication required between the VU and VLSU for vector instructions that are sent to both units and demand coupling. The fourth duty of the VDU is to assemble all scalar operands that are required for a vector instruction. The AU and SU will pass these scalar operands to the VDU. Finally, the VDU dispatches vector instructions to the VU and VLSU. The VDU performs these functions in two stages.

The first stage of the VDU is the Vector PreDispatch Logic (VPDL). The VPDL performs the first three functions of the VDU. Vector instructions are dispatched to the Vector PreDispatch Queue (VPDQ) in-order from the Dispatch Unit (DU). The VPDQ can receive two vector instructions per LClk from DU 82 and can contain up to 32 vector instructions. Each LClk, the VPDL attempts to vpredispatch the instruction at the head of the VPDQ to the Vector Dispatch Queue (VDQ) and/or the Vector Load/Store Dispatch Queue (VLSDQ).

Before the VPDL can pass the instruction to the VDQ and/or VLSDQ, all previous scalar instructions must be committed. Scalar commitment notice is sent from the Active List (AL) in the Dispatch Unit (DU). Each time the scalar commit pointer moves pass a vector instruction in the AL, the DU sends the VDU a go_vdisp signal that indicates that it is safe to remove a vector instruction from the VPDQ. VDU can receive up to four separate go_vdisp[0-3] signals per LClk. The VDU maintains a counter that is incremented each time a go_vdisp signal is received. The VPDL determines that the vector instruction at the head of the VPDQ has no previous scalar speculative instructions if this counter is greater than zero. Each time the VPDL removes a instruction from the VPDQ, it decrements this counter.

Because the VU and the VLSU are decoupled from each other, there needs to be a method to ensure that the VLSU does not execute instructions that require vector register operands before the last write of that register in the vector instruction stream in VU. To allow for this coupling between the VU and VLSU, the VDU and VU contain three structures.

The Vector Busy Flag (VBFlag) registers consists of 96 1-bit registers (VBFlag0—VBFlag95). One flag is assigned to each vector instruction that writes a vector register. These registers are located in VU 66.

At reset, VBFlags are cleared.

The Vector MAP (VMAP) structure contains 32 7-bit registers (VMAP0-VMAP31) that contain the VBFlag register index which was assigned to the last vector instruction in program order that wrote to the corresponding vector register. VMAP0 will have the VBFlag index that is mapped to V0 and VMAP31 will contain the VBFlag for V31. The VMAP registers are located in the VDU.

At reset, VMAP0 is set to 64, VMAP1 to 65, etc.

The VDU also contains the Vector Busy Free Queue (VBFQ) which consists of 64 7-bit entries that contain the VBFlags that are currently not allocated to any vector instruction pass the VPDL.

At reset, the 64 entries are initialized to 0-63.

For each vector instruction that writes a VR a VBFlag must be mapped before the VPDL can send the vector instruction to the VDQ and/or the VLSDQ. The VPDL will read the current VMAP entry for Vi, the result register number, push this VBFlag index onto the VBFQ, dequeue the head of the VBFQ, and write this new VBFlag index into the corresponding VMAP entry. The new VBFlag register in VU will be marked busy, and the VBFlag index will be passed to the VDQ and/or the VLSDQ with the instruction. When the vector instruction is issued in the VU, the indexed VBFlag will be cleared by the VU. Because the maximum number of vector instructions that can be active after the VPDL is less than 96, there will always be a VBFlag index in the VBFQ.

For each vector gather/scatter instruction, the VPDL uses the Vk register number to index into the VMAP registers. The current VBFlag index contained in the VMAP table entry is read and passed with the vector instruction to VLSDQ. When the instruction tries to issue in the VLSU, the VBFlag that the index points to is checked to see if it is still set. If the VBFlag is set, the last write of the vector registers has not executed in the VU, so the instruction will hold issue. If the VBFlag is clear, the instruction is allowed to be issued if there are no other hold issue conditions.

Once the VPDL has receive notice from the AL and has mapped the VBFlags, it will vpredispatch the vector instruction to the VDQ and/or the VLSDQ. All vector instructions are vpredispatched to the VDQ but only vector memory instructions and vector instructions that write VL and VM are sent to the VLSDQ.

The second stage of the VDU, which performs the last two functions of the VDU, are executed in the Vector Dispatch Logic (VDL) and the Vector Load/Store Dispatch Logic (VLSDL). The VDL and the VLSDL perform the same functions, but execute decoupled from each other.

The VDL assembles the required AU and SU scalar operands for each vector instructions bound for VU 66 and then vdispatches these instructions and associated data to the VU. The VLSDL assembles the required AU operands for the vector instructions to be sent to VLSU 68 and vlsdispatches these instructions and required data to the VLSU. The VDL and VLSDL uses seven queues to gather the vector instructions and scalar operands:

1) The Vector Dispatch Queue (VDQ) can contain 48 valid entries of instructions bound for the VU. The queue can accept one instruction per LClk from the VPDL and the VDL can remove one instruction per LClk from VDQ.

2) The Vector AJoperand Queue (VAJQ) contains Aj operands that were read in program order in the AU and sent to the VDU. This queue can contain up to 32 valid entries and is capable of accepting one operand per LClk from the AU.

3) The Vector AKoperand Queue (VAKQ) contains Ak operands that were read in program order in the AU and sent to the VDU. This queue can contain up to 32 valid entries and is capable of accepting one operand per LClk from the AU.

4) The Vector SKoperand Queue (VSKQ) contains Sk operands that were read in program order in the SU and sent to the VDU. This queue can contain up to 32 valid entries and is capable of accepting one operand per LClk from the SU.

5) The Vector Load/Store Dispatch Queue (VLSDQ) can contain 48 valid entries of instructions bound for the VLSU. The queue can accept one instruction per LClk from the VPDL and the VLSDL can remove one instruction per LClk from the VLSDQ.

6) The Vector Load/Store AJoperand Queue (VLSAJQ) contains Aj operands that were read in program order in the AU and sent to the VDU. This queue can contain up to 32 valid entries and is capable of accepting one operand per LClk from the AU.

7) The Vector Load/Store AKoperand Queue (VLSAKQ) contains Ak operands that were read in program order in the AU and sent to the VDU. This queue can contain up to 32 valid entries and is capable of accepting one operand per LClk from the AU.

All five operand queues can receive data from the AU or SU speculatively. If a branch was mispredicted, a kill signal will be sent from the IFU and all operand data that has been speculatively written into the operand queues after the mispredicted branch will be removed.

In operation, the VDL dequeues the head of the VDQ and determine if any operands are required for this vector instruction. If operands are required, the VDL attempts to read the head of the indicated operand queues. If all operands are ready, the VDL vdispatches the instruction and data together to the VU.

In operation, the VLSDL dequeues the head of the VLSDQ and determine if any operands are required for this vector instruction. If operands are required, the VLSDL attempts to read the head of the indicated operand queues. If all operands are ready, the VLSDL vlsdispatches the instruction and data together to the VLSU.

Order is maintained between the two instructions queues and operand queues by receiving instructions in program order from the VPDL and by also receiving operands from the AU and SU in program order.

VU 66 is a two pipe vector unit that is decoupled from SS50 and VLSU 68. VU 66 receives one vector instruction per LClk from VDU 64 in-order and v issues these instructions in-order at a maximum of one instruction per LClk. For most vector instructions the VU will then read multiple operand elements from a VR file 70, execute multiple vector operation, and write multiple result elements to the VR. Different vector instructions can operate out-of-order within VU 66.

Vector instructions are received from VDU 64 and placed in Vector Instruction Queue (VIQ) 81. VIQ 81 can receive one vector instruction per LClk from VDU 64 and can contain up to six valid instructions. If the vector instruction requires scalar operands, the operands are dispatched to VU 66 with the vector instruction. If the vector instruction will write a VR, a Vector Busy Flag (VBFlage) index is also sent with the instruction. VDU 64 will not vdispatch a vector instruction to VU 66 before all previous scalar instructions have been committed. All vector instructions are sent to VU 66.

Vector Issue Logic (VIL) of VU 66 reads the first valid vector instruction in VIQ 81, resolves all VR conflicts, any functional unit conflicts, and then vissues the vector instruction. When a vector instruction is vissued, the VIL sets the correct VR busy, busies the appropriate functional unit, and clears the indicated VBFlag if needed.

Most vector instructions in the VU are executed in the two Vector Pipes (VP0, VP1).

The 32 64-bit VRs, each 64-elements deep (MaxVL), are split between the two VPs. There are 32 logical and 32 physical VRs with no register renaming. Each VP contains 32 elements of each VR 70 and are stored in RAM in a similar manner to that used for SR 58 and AR 56.

The 64 elements are split between the VPs by bit 1 of the 6-bit element number. VP0 contains vector elements that have bit 1 set to 0, and VP1 contains vector elements that have bit 1 set to 1. When performing 64-bit operations, the VRs are 64-bits wide and each element is stored in one 64-bit CRR element. When performing 32-bit operations, the VRs are 32-bit wide and two consecutive elements in a VP are stored in one 64-bit CRR element. The MaxVL for 32-bit operations remains at 64 elements.

This vector register organization has two benefits. One, it allows for 64-bit to 32-bit and 32-bit to 64-bit converts to be executed within a VP. Second, it allows 32-bit operations to execute at 4 results per VP per LClk. Because each VR can have a 64-bit element read and written per SClk, with two 32-bit elements packed to one 64-bit element of the CRR, reading 32-bit VR operands can operate at 4 elements per VP per LClk.

In the embodiment of processor 28 shown in FIG. 7, each vector pipe includes three functional unit groups (FUG1, FUG2 and FUG3). The functional unit groups share common operand and result paths. Since they share paths, only one functional unit in each FUG can be executing at a time.

In one embodiment, FUG1 contains the following vector integer and floating-point functional units: Integer Add/Subtract, Floating-point Add/Subtract, Logical, Integer Compare, and Floating-point Compare. All of FUG1's operations can be either 32-bit or 64-bit operations. FUG1's functional units share two operand paths and one result path. Only one 64-bit operation can be performed in FUG1 per SClk. Two 32-bit operations can be performed per SClk.

FUG2 contains the following integer and floating-point functional units: Integer Multiply, Floating-point Multiply, and Shift. All FUG2's operations can be either 32-bit or 64-bit operations. FUG2's functional units also share two operand paths and one result path for the three functional units. It also can perform only one 64-bit or two 32-bit operation per SClk.

FUG3c contains the following integer and floating-point functional units: Floating-point Divide, Square Root, Leading Zero, Pop Count, Copy Sign, Absolute Value, Logical, Integer Convert, Floating-point Convert, and Merge.

All of FUG3's operations can be either 64-bit or 32-bit operations. FUG3c has two operand paths and one result path. All operations but Divide and Square Root can perform one 64-bit or two 32-bit operations per SClk. FUG3c can perform one 64-bit Divide or Square Root operation every fourth LClks and 32-bit operations once every two LClks. Both FUG3c for VP0 and VP1 shares one operand path and its result path with two functional units external to the VP0 and VP1 (the Bit Matrix Multiply Unit and the Iota Functional Unit).

FUG4 is a functional unit that performs the following operations on VMs: Fill, Last element set, First Element Set, Pop Count, and Logical. This functional unit does not read the VRs, but performs single operations by reading and writing the VMs. All these operations are MaxVL-bit operations (64). One FUG4 operation can be issued per LClk.

To control the number of vector operations that are performed for each vector instruction, the VU contains two other register sets, the Vector Length Register (VL and eight Vector Mask Registers (VM).

The VL register contains a value between 0 and MaxVL and limits the number of vector elements that are read, vector operations that are performed, and vector elements that are written when a vector instructions is vissued. The 64-bit VL register is set by an AR operand from the AU and can be read back to an AR.

The Vector Mask Registers are used to control vector instructions on a per element basis. They can also contain the results of vector comparison operations. The eight VMs are each 1-bit wide and MaxVL elements long.

Not all vector instructions are performed under the control of VL and VM registers. Vector instructions that do execute under the control of VL and/or VM registers are called elemental vector instructions For elemental vector instructions, the current contents of VL are read at vissue to determine the number of operations to perform. At vissue, if VL is currently zero, no vector operations are performed. The only elemental vector operations that are not executed under the control of VL are vi scan(ak,mj) and vi cidx(ak,mj). These two instructions always execute MaxVL elements.

Most elemental vector operations also use a VM register to control the vector instruction on a per element basis. At vissue, the specified VM is used to control which of the VL elements are written. For VM register elements that are set to one, the indicated operations are performed on the corresponding elements. For VM register elements that are cleared, the operations may still be performed but no VR elements will be written, no exception generate, and no data will be written to memory. The bit matrix multiply (bmm vk) vector instruction is not controlled by VM.

For instructions that are not elemental vector instructions, the number of operations performed is not determined by the contents of the VL and VM registers. Most non-elemental vector operations are memory ordering instructions, single element moves between AR/SRs and the VRs, and VM operations.

Vector Load/Stores Operations

Vector memory load and store instructions perform different than the instructions that are executed in the FUGs. Vector memory operations are executed in both the VU and the VLSU. The VLSU executes decoupled from the VU, generates the addresses for the vector loads and stores, and sends them to EIU 54.

For vector loads, the VU moves the memory data into the VR. For vector stores, the VU reads a VR and sends the store data to the EIU. The store address and data is sent decoupled to the EIU. This process is described in patent application Ser. No. 10/643,742, entitled Decoupled Store Address and Data in A Multiprocessor System", filed herewith, the description of which is incorporated herein by reference.

Vector load and gather instructions are executed using the load buffers 78 of the two VPs. Each VP of VU 66 contains a 256 64-bit entry load buffer (LB) 78 that is loaded with vector memory data by VLSU 68. In one embodiment, LBs 78 are separated into eight individual load buffers (LBUF0-LBUF7), each 64 64-bit elements deep.

When a vector load instruction reaches the head of the VIQ, the Vector Issue Logic performs two issue checks. First, the vector result register must be not busy. Second, VLSU 68 must have generated all the vector memory addresses without an address fault, and indicated this to VU 66 by setting the control for one of the eight LBs 78. The VIL will then issue the vector load or gather instruction to the control section of one of the eight LBs. When all the memory load data has been loaded into the LB for this load, the LB control will move the elements from the LB into the VR. Only the elements specified by VL and the VM will be written into the VR. Eight moves from the LB to the VR can occur per LClk. When all of the elements have been removed from the LB, the LB is marked clear by VU 66 so VLSU 68 can reallocate it. If the addresses generated in the VLSU generated a fault, VU traps.

Vector store and scatter instructions are also executed in both the VU and VLSU. For vector store instructions, the VLSU again generates all of the memory addresses, transmits them to the EIU, and send notice to the VU if the addresses generated a fault. The VU, then waits for the vector store instruction to reach the head of the VIQ, checks if the VR to be stored is busy, verifies that the addresses generated in the VLSU did not fault and then send the store data to the EIU for the elements that are indicated by the VL and the VM. Each VP has an operand path from the VR to an external path that is linked to the EIU. This allows for four vector store data operands to be sent per LClk.

VLSU 68 will be discussed next. VLSU 68 is the vector address generation engine of processor 28. As note above, execution within VLSU 68 is decoupled from SS 50 and VU 66.

VLSU 68 generates addresses for VU 66. The VLSU receives its vector instructions from VDU 64, interfaces with VU 66 for gather and scatter index operands, and transmits memory requests to EIU 54.

The VLSU receives one instructions from the VDU per LClk. Instructions are placed in VLSIQ, which can contain up to six scalar instructions. The VLSIQ receives any scalar operands needed for the vector instructions from VDU 64 with the instruction. The VLSU receives all vector memory instructions and any vector instruction that writes a VL or VM register. (VLSU 68 receives instructions that write VL and VM registers because the VLSU maintains its own private copy of the VL and VM registers.

The Vector Load/Store Issue logic executing in VLSU 68 performs all the required checks for the vector memory instructions at the head of the VLSIQ and attempts to issue the instruction to Vector Address Generation logic. The Vector Load/Store Issue logic can issue one instruction per LClk.

The Vector Address Generation logic generates four memory requests per LClk, performs four address translations per LClk using the four Vector TLBs (VTLB), and places the four physical addresses in one of four Vector Request Buffers (VRB0-VRB3).

As noted above, for vector loads, the VLSU assigns one of eight LBs 78. For strided vector loads, the Vector Load/Store Issue logic only checks for a free LB 78 that can be allocated. If an LB 78 is free, it issues the load to the Vector Address Generation logic, assigns one of the eight LBs 78 to the vector load and informs VU 66 that the selected LB is valid. For vector gather instructions, the Vector Load/Store Issue logic needs to check for an allocatable LBUF and also that the VR needed for the index is valid and ready. The Vector Load/Store Issue logic uses the VBFlags to check to see that the VR needed for the index is valid and ready.

In one embodiment, VU 66 contains 96 VBFlags. For each vector instruction that writes a VR, VDU 64 assigns a VBFlag index to that instruction and sets the indexed VBFlag busy. When VU 66 issues the vector instruction, it clears this flag.

When a gather instruction is sent from VDU 64 to VLSU 68, it includes the last VBFlag index of the vector index (Vk). When the gather instruction reaches the head of the VLSIQ, the Vector Load/Store Issue logic checks to see if the indexed VBFlag in the VU is still set. If it is, the last write of the k-operand has not occurred and the Vector Load/Store Issue logic holds issue. If the VBFlag is cleared, the Vector Load/Store Issue logic then requests the VR from the VU. When the VR is free, (it might still be busy from the instruction that cleared the VBFlag) the VU will send the VR elements to the VLSU four element per LClk. The VU reads these elements from the VR and sends them to the VLSU through an external register path. The Vector Load/Store Issue logic also assigns an LB 78 to the gather instruction.

In one embodiment, all vector store instructions require verification that all previous scalar and vector loads have been sent to memory. Vector load to store ordering is done by EIU 54 while the scalar load to vector store ordering is enforced by Active List 94 in the DU and by the Vector Load/Store Issue logic. The VLSU receives a signal from AL 94 each time the "reference sent" pointer passes a vector store instructions. The VLSU can receive four reference sent signals per LClk. The VLSU increments a vector store counter each time it receives a signal. For the Vector Load/Store Issue logic to issue a vector store instruction, the vector store counter must be non-zero. Each time a vector store instruction is issued, the counter is decremented.

For scatter operations, the VLSU conducts the same VBFlag busy check that is performed for gather instructions. When the VBFlag is cleared, the VLSU again asks the VU for the VR and the VU send the VLSU four elements per LClk when the register if available.

The Vector Address Generation logic of the VLSU receives the base address from the Vector Load/Store Issue logic. For strided references, it also receive the stride value from the VLSIL. For gather and scatter vector instructions it receives the vector indexes from the VU. The Vector Address Generation logic can generate up to four addresses per LClk. The number of addresses generated are determined by the contents of VL and the selected VM. If the VL is currently zero, no vector addresses are generated. For non-zero VL, the Vector Address Generation logic generates VL addresses. If the corresponding element in the selected VM is not set, this address is not passed to VTLB.

In one embodiment, VLSU 68 contains four VTLBs (VTLB0-VTLB3). All vector addresses are translated by the VTLBs and perform the required address check. The VTLB reports completion of translation and any error back to the DU. Possible errors are: 1) Address Error: unaligned access, or access to a privileged or reserved memory region; 2) VTLB Fault: miss in the TLB; 3) VTLB Conflict: multiple hits in the TLB; and 4) VTLB Modify Fault: store to a page marked read only.

After VTLB physical addresses are placed in Vector Request Buffers (VRB0-VRB3). Each VRB can contain 64 valid addresses.

For vector load instructions, the Vector Address Generation logic also creates a Vector Outstanding Request Buffer (VORB) entry for each vector address. The VORB contains 512 entries that is indexed by the transaction ID (TID) sent to the E chip 24 in the request packet and returned in the response. Each VORB entry contains LB 78 indexes that point to the LB 78 entry that the data should be loaded into when it returns from E Chip 24.

DEFINITIONS

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. In a computer system having a scalar processing unit and a vector processing unit, wherein the vector processing unit includes a vector dispatch unit and wherein the vector dispatch unit includes a predispatch queue and a dispatch queue, a method of decoupling operation of the scalar processing unit from that of the vector processing unit, the method comprising:

dispatching vector instructions from the scalar processing unit to the vector dispatch unit, wherein dispatching includes sending the vector instructions from the scalar processing unit to the vector dispatch unit even if all scalar operands are not ready and even if all scalar instructions issued prior to the vector instructions are not scalar committed;

queueing up the vector instructions received from the scalar processing unit in the vector dispatch unit's predispatch queue;

reading scalar operands from the scalar processing unit, wherein reading includes transferring the scalar operands from the scalar processing unit to the vector dispatch unit;

predispatching the vector instructions from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;

dispatching the predispatched vector instruction from the dispatch queue if all required scalar operands are ready; and executing the vector instruction dispatched from the dispatch queue as a function of the scalar operands.

2. The method according to claim 1, wherein executing the dispatched vector instruction includes translating an address associated with the vector instruction and trapping on a translation fault.

3. The method according to claim 1, wherein the method further includes marking the vector instruction as complete, wherein marking the vector instruction as complete includes:

if the vector instruction is not a memory instruction and if the vector instruction does not require scalar operands, indicating that the vector instruction is complete when the vector instruction is dispatched from the scalar processing unit;

if the vector instruction is not a memory instruction but requires scalar operands, indicating that the vector instruction is complete when the scalar operands are available; and if the vector instruction is a memory instruction, indicating that the vector instruction is complete when the vector address has been translated; and graduating the vector instruction if the vector instruction is marked complete.

4. In a computer system having a scalar processing unit and a vector processing unit, wherein the vector processing unit includes a vector dispatch unit and wherein the vector dispatch unit includes a predispatch queue and a dispatch queue, a method of decoupling operation of the scalar processing unit from that of the vector processing unit, the method comprising:

dispatching vector instructions from the scalar processing unit to the vector dispatch unit, wherein dispatching includes sending the vector instructions from the scalar processing unit to the vector dispatch unit even if all scalar operands are not ready and even if all scalar instructions issued prior to the vector instructions are not scalar committed;

queueing up the vector instructions received from the scalar processing unit in the vector dispatch unit's predispatch queue;

reading scalar operands from the scalar processing unit, wherein reading includes transferring the scalar operands from the scalar processing unit to the vector dispatch unit;

predispatching, the vector instructions from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;

dispatching the predispatched vector instruction from the dispatch queue if all required scalar operands are ready;

generating an address for a vector load;

issuing a vector load request to memory;

receiving vector data from memory;

storing the vector data in a load buffer;

transferring the vector data from the load buffer to a vector register; and executing the vector instruction dispatched from the vector dispatch queue on the vector data stored in the vector register.

5. The method according to claim 4, wherein the vector processing unit includes a vector execute unit and a vector load/store unit, wherein issuing a vector load request to memory includes issuing and executing vector memory references in the vector load/store unit when the vector load store unit has received the instruction and memory operands from the scalar processing unit.

6. The method according to claim 4, wherein storing the vector data in a load buffer and transferring the vector data from the load buffer to a vector register are decoupled from each other.

7. The method according to claim 4, wherein storing the vector data in a load buffer includes writing memory load data to the load buffer until all previous memory operations complete without fault.

8. The method according to claim 5, wherein storing the vector data in a load buffer and transferring the vector data from the load buffer to a vector register are decoupled from each other.

9. The method according to claim 5, wherein storing the vector data in a load buffer includes writing memory load data to the load buffer until all previous memory operations complete without fault.

10. In a computer system having a scalar processing unit and a vector processing unit, wherein the vector processing unit includes a vector dispatch unit and wherein the vector dispatch unit includes a predispatch queue and a dispatch queue, a method of decoupling operation of the scalar processing unit from that of the vector processing unit, the method comprising:

dispatching vector instructions from the scalar processing unit to the vector dispatch unit, wherein dispatching includes sending the vector instructions from the scalar processing unit to the vector dispatch unit even if all scalar operands are not ready and even if all scalar instructions issued prior to the vector instructions are not scalar committed;

queueing up the vector instructions received from the scalar processing unit in the vector dispatch unit's predispatch queue;

reading scalar operands from the scalar processing unit, wherein reading includes transferring the scalar operands from the scalar processing unit to the vector dispatch unit;

predispatching the vector instructions from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;

dispatching the predispatched vector instruction from the dispatch queue if all required scalar operands are ready;

generating a first and a second address for a vector load;

issuing first and second vector load requests to memory;

receiving vector data associated with the first and second addresses from memory;

storing vector data associated with the first address in a first vector register;

storing vector data associated with the second address in a second vector register;

executing a vector instruction on the vector data stored in the first vector register;

renaming the second vector register; and executing the vector instruction dispatched from the dispatch queue on the vector data stored in the renamed vector register.

11. The method according to claim 10, wherein the vector processing unit includes a vector execute unit and a vector load/store unit, wherein issuing a vector load request to memory includes issuing and executing vector memory references in the vector load/store unit when the vector load store unit has received the instruction and memory operands from the scalar processing unit.

12. A computer system, comprising:

a scalar processing unit; and a vector processing unit, wherein the vector processing unit includes a vector dispatch unit, a vector execute unit and a vector load/store unit, wherein the vector dispatch unit includes a predispatch queue and a dispatch queue;

wherein the scalar processing unit dispatches a vector instructions to the vector dispatch unit even if all scalar operands associated with the instructions are not ready;

wherein the scalar processing unit reads scalar operands and transfers the read scalar operands from the scalar processing unit to the vector dispatch unit;

wherein the vector dispatch unit stores vector instructions received from the scalar processing unit in the vector dispatch unit's predispatch queue, predispatches the vector instructions from the predispatch queue to the dispatch queue in the order received;

wherein the vector dispatch unit determines if all scalar instructions issued prior to the vector instruction at the head of the predispatch queue are scalar committed and transfers the vector instruction from the predispatch queue to the dispatch queue only if all scalar instructions issued prior to the vector instruction at the head of the predispatch queue are scalar committed;

wherein the vector dispatch unit dispatches the predispatched vector instruction from the vector dispatch unit to one or more of the vector execute unit and the vector load/store unit if all required scalar operands are ready;

wherein the vector load/store unit receives an instruction and memory operands from the scalar processing unit, issues and executes a vector memory load reference as a function of the instruction and the memory operands received from the scalar processing unit, and stores data received as a result of the vector memory reference in a load buffer; and wherein the vector execute unit issues the vector memory load instruction and transfers the data received as a result of the vector memory reference from the load buffer to a vector register.

13. The system according to claim 12, wherein the load buffer stores memory load data until it is determined that no previous memory operation will fail and, if no previous memory operations have failed, the load buffer transfers the data to the vector register.

14. In a computer system having a scalar processing unit and a vector processing unit, wherein the vector processing unit includes a vector dispatch unit and wherein the vector dispatch unit includes a predispatch queue and a dispatch queue, a method of decoupling scalar and vector execution, comprising:

dispatching scalar instructions to a scalar instruction queue in the scalar processing unit;

dispatching a vector instruction that requires scalar operands from the scalar processing unit to the scalar instruction queue and to the predispatch queue, wherein dispatching includes sending the vector instruction from scalar processing unit to the predispatch queue even if all scalar operands are not ready;

queueing up two or more vector instructions received from the scalar processing unit in the predispatch queue;

executing the vector instruction in the scalar processing unit, wherein executing the vector instruction in the scalar processing unit includes writing a scalar operand to a scalar operand queue;

predispatching, within the vector dispatch unit, the vector instructions from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;

notifying the vector processing unit that the scalar operand is available in the scalar operand queue;

dispatching the predispatched vector instruction from the dispatch queue of the vector dispatch unit, if all required scalar operands are ready; and executing the vector instruction dispatched from the vector dispatch unit in the vector processing unit, wherein executing the vector instruction in the vector processing unit includes reading the scalar operand from the scalar operand queue.

15. The method according to claim 14, wherein the method further includes marking the vector instruction as complete, wherein marking the vector instruction as complete includes:

if the vector instruction is not a memory instruction and if the vector instruction does not require scalar operands, indicating that the vector instruction is complete when the vector instruction is dispatched from the scalar processing unit;

if the vector instruction is not a memory instruction but requires scalar operands, indicating that the vector instruction is complete when the scalar operands are available; and if the vector instruction is a memory instruction, indicating that the vector instruction is complete when the vector address has been translated; and graduating the vector instruction if the vector instruction is marked complete.

16. In a computer system having a scalar processing unit and a vector processing unit, wherein the vector processing unit includes a vector dispatch unit and wherein the vector dispatch unit includes a predispatch queue and a dispatch queue, a method of decoupling a vector memory reference and a vector execution, comprising:

dispatching scalar instructions to a scalar instruction queue in the scalar processing unit;

dispatching a vector instruction from the scalar processing unit to the scalar instruction queue and to the predispatch queue in the vector processing unit, wherein dispatching includes sending the vector instruction from the scalar processing unit to the predispatch queue in the vector processing unit even if all scalar operands are not ready;

queueing up two or more vector instructions received from the scalar processing unit in the predispatch queue;

executing the vector instruction in the scalar processing unit, wherein executing the vector instruction in the scalar processing unit includes generating an address and writing the address to a scalar operand queue;

predispatching, within the vector dispatch unit, the vector instructions from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;

notifying the vector processing unit that the address is available in the scalar operand queue;

dispatching the predispatched vector instruction from the dispatch queue of the vector processing unit if all required scalar operands are ready; and executing the vector instruction dispatched from the vector processing unit in the vector processing unit, wherein executing the vector instruction in the vector processing unit includes reading the address from the scalar operand queue and generating a memory request as a function of the address read from the scalar operand queue.

17. The method according to claim 16, wherein the method further includes marking the vector instruction as complete, wherein marking the vector instruction as complete includes:
  if the vector instruction is not a memory instruction and if the vector instruction does not require scalar operands, indicating that the vector instruction is complete when the vector instruction is dispatched from the scalar processing unit;
  if the vector instruction is not a memory instruction but requires scalar operands, indicating that the vector instruction is complete when the scalar operands are available; and
  if the vector instruction is a memory instruction, indicating that the vector instruction is complete when the vector address has been translated; and
  graduating the vector instruction if the vector instruction is marked complete.

18. In a computer system having a scalar processing unit and a vector processing unit, wherein the vector processing unit includes a vector dispatch unit and wherein the vector dispatch unit includes a predispatch queue and a dispatch queue, a method of executing a vector instruction, comprising:
  dispatching scalar instructions to a scalar instruction queue in the scalar processing unit;
  dispatching a vector instruction from the scalar processing unit to the scalar instruction queue and to the predispatch queue in the vector processing unit, wherein dispatching includes sending the vector instruction from the scalar processing unit to the predispatch queue in the vector processing unit even if all scalar operands are not ready;
  queueing up two or more vector instructions received from the scalar processing unit in the predispatch queue;
  executing the vector instruction in the scalar processing unit, wherein executing the vector instruction in the scalar processing unit includes generating an address and writing the address to a scalar operand queue;
  predispatching, within the vector dispatch unit, the vector instructions from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;
  notifying the vector processing unit that the address is available in the scalar operand queue;
  dispatching the predispatched vector instruction from the dispatch queue of the vector processing unit if all required scalar operands are ready; and
  executing the vector instruction dispatched from the vector processing unit in the vector processing unit, wherein executing the dispatched vector instruction in the vector processing unit includes:
    reading the address from the scalar operand queue;
    generating a memory request as a function of the address read from the scalar operand queue;
    receiving vector data from memory;
    storing the vector data in a load buffer;
    transferring the vector data from the load buffer to a vector register; and
    executing a vector instruction on the vector data stored in the vector register.

19. In a computer system having a scalar processing unit and a vector processing unit, wherein the vector processing unit includes a vector dispatch unit and wherein the vector dispatch unit includes a predispatch queue and a dispatch queue, a method of unrolling a loop, comprising:
  preparing a first and a second vector instruction, wherein each vector instruction executes an iteration through the loop and wherein each vector instruction requires calculation of a scalar loop value;
  dispatching the first and second vector instructions from the scalar processing unit to a scalar instruction queue in the scalar processing unit and to the predispatch queue in the vector processing unit, wherein dispatching includes sending the first and second vector instructions from the scalar processing unit to the predispatch queue in the vector processing unit even if all scalar operands are not ready;
  queueing up the first and second vector instructions received from the scalar processing unit in the predispatch queue;
  executing a portion of each vector instruction in the scalar processing unit, wherein executing a portion of each vector instruction in the scalar processing unit includes writing a scalar operand representing the scalar loop value calculated for each vector instruction to a scalar operand queue;
  predispatching, within the vector processing unit, each vector instruction received from the scalar processing unit if all previously received vector instructions are scalar committed;
  predispatching, within the vector dispatch unit, each vector instruction from the predispatch queue to the dispatch queue in the order received, wherein predispatching includes determining if all scalar instructions issued prior to the vector instruction at the head of the predispatch queue are scalar committed and transferring the vector instruction from the predispatch queue to the dispatch queue only if all scalar instructions issued prior to the vector instruction at the head of the predispatch queue are scalar committed;
  notifying the vector processing unit that the scalar operand is available in the scalar operand queue;
  dispatching the predispatched vector instruction from the dispatch queue of the vector processing unit if all required scalar operands are ready; and
  executing the first and second vector instructions dispatched from the dispatch queue of the vector processing unit, wherein executing the dispatched vector instruction in the vector processing unit includes reading the scalar operands associated with each instruction from the scalar operand queue.

* * * * *

UNITED STATES PATENT AND TRADEMARK OFFICE
CERTIFICATE OF CORRECTION

PATENT NO.       : 7,334,110 B1
APPLICATION NO.  : 10/643586
DATED            : February 19, 2008
INVENTOR(S)      : Faanes et al.

It is certified that error appears in the above-identified patent and that said Letters Patent is hereby corrected as shown below:

On page 2, under "Other Publications", in column 2, line 30, delete "Architecutre" and insert -- Architecture --, therefor.

On page 2, under "Other Publications", in column 2, line 39, delete "Interconnetion" and insert -- Interconnection --, therefor.

On page 2, under "Other Publications", in column 2, line 43, delete "Airthmetic" and insert -- Arithmetic --, therefor.

On page 2, under "Other Publications", in column 2, line 58, delete "Stepsinto" and insert -- Steps into --, therefor.

On page 4, under "Other Publications", in column 1, line 6, delete "acton" and insert -- action --, therefor.

In column 5, line 40, delete "ecache" and insert -- Ecache --, therefor.

In column 6, line 40, delete "modem" and insert -- modern --, therefor.

In column 11, line 30, delete "be" and insert -- been --, therefor.

In column 15, line 23, delete "(VBFlage)" and insert -- (VBFlag) --, therefor.

In column 16, line 48, after "instruction" insert -- . --.

In column 18, line 41, delete "element" and insert -- elements --, therefor.

In column 19, line 23, after "that" delete "is" and insert -- are --, therefor.

UNITED STATES PATENT AND TRADEMARK OFFICE
CERTIFICATE OF CORRECTION

PATENT NO. : 7,334,110 B1
APPLICATION NO. : 10/643586
DATED : February 19, 2008
INVENTOR(S) : Faanes et al.

It is certified that error appears in the above-identified patent and that said Letters Patent is hereby corrected as shown below:

In column 22, line 62, in Claim 12, after "dispatches" delete "a".

Signed and Sealed this

First Day of July, 2008

JON W. DUDAS
*Director of the United States Patent and Trademark Office*